United States Patent
Hill et al.

(10) Patent No.: US 9,921,716 B2
(45) Date of Patent: *Mar. 20, 2018

(54) MINIMAL AND PREFERENTIAL OPTION USER INTERFACE

(71) Applicant: Sony Corporation, Tokyo (JP)

(72) Inventors: Seth Hill, La Mesa, CA (US); Hyehoon Yi, Escondido, CA (US); Sabrina Yeh, Laguna Beach, CA (US); Tracy Barnes, San Diego, CA (US); Steven Friedlander, San Diego, CA (US)

(73) Assignee: Saturn Licensing LLC, New York, NY (US)

( * ) Notice: Subject to any disclaimer, the term of this patent is extended or adjusted under 35 U.S.C. 154(b) by 944 days.

This patent is subject to a terminal disclaimer.

(21) Appl. No.: 14/269,421

(22) Filed: May 5, 2014

(65) Prior Publication Data
US 2014/0245149 A1    Aug. 28, 2014

Related U.S. Application Data

(63) Continuation of application No. 12/877,454, filed on Sep. 8, 2010, now Pat. No. 8,756,502.

(51) Int. Cl.
*G06F 3/048*  (2013.01)
*G06F 3/0482*  (2013.01)
(Continued)

(52) U.S. Cl.
CPC .......... *G06F 3/0482* (2013.01); *G06F 3/0481* (2013.01); *G06F 3/0484* (2013.01); *G06F 3/04817* (2013.01)

(58) Field of Classification Search
CPC .................. G06F 3/016; G06F 3/048
See application file for complete search history.

(56) References Cited

U.S. PATENT DOCUMENTS

| 5,648,781 A | 7/1997 | Choi |
| 5,929,857 A | 7/1999 | Dinallo et al. |

(Continued)

FOREIGN PATENT DOCUMENTS

| JP | 2012014459 A | * | 1/2012 |
| JP | 2012014459 A |   | 1/2012 |

OTHER PUBLICATIONS

Huang et al; TVSkin-able User Interface for Digital TV Systems; 2007; IEEE; 7 pages.

(Continued)

*Primary Examiner* — Linh K Pham
(74) *Attorney, Agent, or Firm* — John L. Rogitz

(57) ABSTRACT

A request to display a portion of a full-screen content overlay options menu of a multiple media player device is detected by the multiple media player device that represents less than all of the full-screen content overlay options menu. A media type of content media currently accessed by the multiple media player device is determined. A current setting status of an available adjustment of the multiple media player device associated with the portion of the full-screen content overlay options menu based upon the determined media type of content media currently accessed by the multiple media player device is determined. A first graphical menu pane of the full-screen content overlay options menu, including the current setting status of the available adjustment, is displayed over full-screen content on a display. This abstract is not to be considered limiting, since other embodiments may deviate from the features described in this abstract.

27 Claims, 12 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 6,020,929 A * | 2/2000 | Marshall | H04N 5/44543 345/629 |
| 6,151,059 A * | 11/2000 | Schein | H04N 5/44543 348/563 |
| 6,690,391 B1 | 2/2004 | Proehl et al. | |
| 6,784,879 B1 | 8/2004 | Orr | |
| 7,353,461 B2 | 4/2008 | Davidsson et al. | |
| 7,590,659 B2 | 9/2009 | Merrce et al. | |
| 7,712,039 B2 | 5/2010 | Bank | |
| 7,941,819 B2 * | 5/2011 | Stark | G06F 17/30861 348/563 |
| 7,987,484 B2 * | 7/2011 | Sloo | H04N 5/44543 707/804 |
| 8,228,435 B2 * | 7/2012 | Yi | H04N 5/44591 348/570 |
| 2002/0069415 A1 | 6/2002 | Humbard et al. | |
| 2002/0075318 A1 * | 6/2002 | Yang | H04N 5/44543 715/810 |
| 2003/0070171 A1 * | 4/2003 | Jeon | H04N 5/44543 725/56 |
| 2003/0075983 A1 | 4/2003 | Stecyk et al. | |
| 2006/0005221 A1 | 1/2006 | MacBath et al. | |
| 2006/0174266 A1 | 8/2006 | Gatto et al. | |
| 2006/0179419 A1 * | 8/2006 | Narahara | G06F 17/30817 717/109 |
| 2007/0058569 A1 | 3/2007 | McMenamin et al. | |
| 2007/0150828 A1 * | 6/2007 | Tsukada | G06F 17/30058 715/777 |
| 2007/0229465 A1 * | 10/2007 | Sakai | G08C 17/00 345/173 |
| 2007/0271531 A1 | 11/2007 | Chuang | |
| 2008/0062127 A1 | 3/2008 | Brodersen et al. | |
| 2008/0178214 A1 | 7/2008 | Shivaji-Rao | |
| 2008/0184303 A1 | 7/2008 | Schein et al. | |
| 2009/0125845 A1 | 5/2009 | Lacock et al. | |
| 2009/0178008 A1 | 7/2009 | Herz et al. | |
| 2010/0153997 A1 | 6/2010 | Baumgartner et al. | |
| 2010/0257560 A1 | 10/2010 | Fukuda et al. | |
| 2010/0306428 A1 * | 12/2010 | Jackson | G06F 1/16 710/72 |
| 2010/0318941 A1 | 12/2010 | Yamada et al. | |
| 2011/0179451 A1 | 7/2011 | Miles et al. | |
| 2012/0005707 A1 * | 1/2012 | Marshall | H04N 5/44543 725/41 |
| 2012/0050185 A1 * | 3/2012 | Davydov | G06F 3/04883 345/173 |

OTHER PUBLICATIONS

Vankeirsbilck et al.; Integrating Personal Media and Digital TV with QoS Guarantees using Virtualized Set-Top Boxes; Architecture and Performance measurements; 2010; IEEE; 8 pages.
Lin et al.; On Controlling Digital TV Set-Top Box by Mobile Devices via IP Network; 2005; IEEE; 8 pages.
Muhebbullah, Sajeda; USPTO Examiner, Non-final office action, U.S. Appl. No. 12/877,444; dated May 22, 2013.
Anonomous, LED TV 6C6300 User Manual, Samsung, 2010.
Muhebbullah, Sajeda; USPTO Examiner, Non-final office action, U.S. Appl. No. 12/877,444; dated Dec. 5, 2012.

* cited by examiner

MINIMAL AND PREFERENTIAL OPTION USER INTERFACE

CROSS REFERENCE TO RELATED DOCUMENTS

This application is a continuation of pending U.S. patent application Ser. No. 12/877,454, filed Sep. 8, 2010. This application also is related to filed U.S. utility patent application Ser. No. 12/877,444 entitled "DYNAMIC ICONIC SETTING INDICATOR," and U.S. design patent application Ser. No. 29/369,421 entitled "PROGRESSIVE PLAYER OPTIONS MENU," each of which is incorporated herein by reference in their entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

User interfaces for televisions and other user interface devices have hierarchical menu structures. User interface windows are sometimes nested within such a hierarchical menu structure. User interface windows are populated with words and/or icons that describe the associated information. A user of such a user interface may navigate to submenus within the user interface to determine settings. The user further navigates to another hierarchical level within the user interface hierarchical structure to change the settings.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
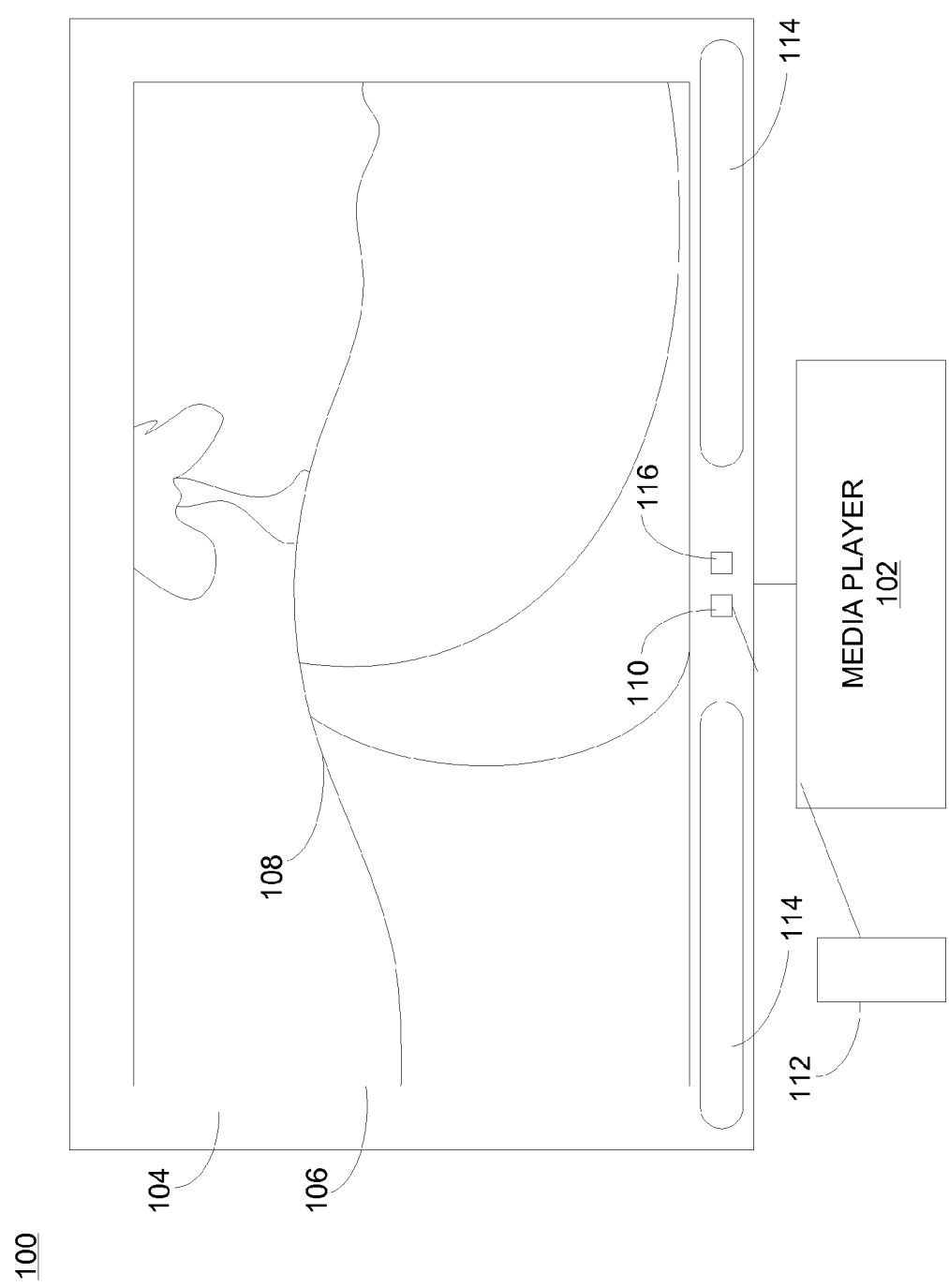
FIG. 1 is a diagram of an example of a system including a media player device that provides automated dynamic iconic setting indicators and an automated minimal and preferential option user interface for a television device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides an automated dynamic iconic setting indicator. The automated dynamic iconic setting indicator provides ready access to setting status information without requiring a user of a user interface of a television or other visual output device to navigate through a hierarchy of menus to access the setting status information. The automated dynamic iconic setting indicator further reduces display screen area requirements. Icons are used to present the setting status. The setting status icons are updated in real time in response to changes to the associated settings. The setting status icons are paired with option icons to further reduce screen area requirements, while preserving information availability with a reduced display screen footprint. The paired option icons and setting status icons are displayed within translucent graphical menu panes as a graphical overlay over full-screen content to further reduce content rendering interruption.

The present subject matter also provides an automated minimal and preferential option user interface. A user of a user interface of a television or other visual output device is provided with a number of different ways of accessing options with reduced display screen area impact. A non-hierarchical options menu is provided that works with available remote control device keys without requiring specific or numerous keys to access and navigate the non-hierarchical options menu. Available options of the options menu are determined dynamically based upon a media type currently accessed by a multiple media player device, as described in more detail below. For purposes of the present description, a multiple media player device may include any device capable of accessing and rendering/playing multiple different media types (e.g., still photographs, audio and video content, etc.).

Certain remote control devices may have direct access keys, while certain remote control devices may utilize directional keys (e.g., UP arrow, DOWN arrow, LEFT arrow, and RIGHT arrow keys) to initiate display of the options menu, to navigate to options, and to select options for modification without requiring a remote control with a high number of dedicated input keys and without requiring navigation through a multi-level hierarchical menu structure. With the automated minimal and preferential option user interface, a user may directly access a setting rather than going through a menu to find the setting. The options menu learns user input patterns and gives preferential treatment to a preferred usage method the user adopts. For touchscreen display implementations, user screen contact in areas relative to a display location for the options menu, or portions thereof, may be detected and utilized to access and navigate additional portions of the options menu, to access and change adjustable options associated with the currently-accessed media type, and to navigate the non-hierarchical options menu.

The non-hierarchical options menu may be displayed as a full-screen content overlay options menu while reducing intrusion upon that rendered content. For example, the non-hierarchical options menu may be displayed along a border and/or corner of an output display (e.g., lower left corner), and may further be translucent to allow content to be displayed through the setting options menu panes.

Further, if a setting was previously accessed or adjusted, that setting may be changed to the default setting for display during a next menu display event. The menu option panels/windows (based upon the type of media content as described in more detail below) may be progressively presented to the user in response to a variety of detected input keys or key combinations. For example, in response to detection of a request to display a portion of a full-screen content overlay options menu of the media player device, such as detection of an UP arrow key or a LEFT arrow key, the configured default setting graphical menu may be displayed without display of additional options. Alternatively, a first key press of a dedicated input key may cause display of a first graphical menu pane associated with the dedicated input key including the current setting status of an available adjustment over full-screen content on a display. The first graphical menu pane may include a setting status icon paired with an option icon, as described above. Accordingly, in response to detection of a request to display a portion of a full-screen content overlay options menu of the media player device, the configured default setting graphical menu or a dedicated graphical menu pane may be displayed without display of additional options.

During subsequently detected key inputs, additional graphical menu panes (e.g., translucent graphical menu panes) may be displayed. For example, a second input key (e.g., a LEFT arrow key) may cause a first control pane that includes an adjustment control for the associated current setting status to be displayed to a side of the first graphical menu pane that includes the option icon and current setting status pair. Alternatively, the first graphical menu pane and the first control pane may be displayed coincident to detection of a single initial key input, such as a general input key or a dedicated input key.

Detection of an additional input key (e.g., an additional LEFT arrow key or RIGHT arrow key) may cause an adjustment of the associated current setting status, such as rewinding of content in response to detection of a LEFT arrow key input when the first graphical menu pane is associated with content rendering position. Detection of an additional input key (e.g., an UP arrow key or a DOWN arrow key) may cause additional menu panes associated with the status of other current settings associated with the currently-accessed media type to be displayed. Detection of an additional input key (e.g., an UP arrow key or a DOWN arrow key) may cause the displayed menu panes to scroll vertically (or horizontally as appropriate for a given implementation), and a new control pane that displays an option icon and current setting status pair of the respective setting may be displayed to a side of the menu pane that is the new bottom menu pane (or top, per the given implementation).

The progressive display of options, from a display of a single option setting menu pane with a single icon pair to change a single setting if only one setting is requested, through the display of additional options in response to additional non-hierarchical navigation inputs, further reduces the display area requirements of the non-hierarchical options menu. These features allow for reduced intrusion and interruption of the rendered full-screen content while overlaying the information requested by a user.

The non-hierarchical options menu may further be dynamically populated based upon a media type of content media currently accessed via the media player device. For example, where the accessed content is a collection of photographs, video content adjustment options, such as contrast, brightness, and other video options may be dynamically made available for adjustment. Alternatively, where the accessed content is audio and video content, audio adjustment options may also be made available, such as volume, tone, and balance. Accordingly, a non-hierarchical options menu may further be dynamically populated based upon a media type of content media currently accessed via the media player device.

Display of the additional graphical menu panes in response to detection of additional user input(s) may be arranged, for example, as a stacked column of translucent graphical menu panes. The stacked column may be scrolled vertically in a modulo manner in response to additional detected key inputs. For purposes of the present description, the term "modulo" scrolling refers to scrolling multiple user interface elements, in this case the example stacked column of translucent graphical menu panes, by displaying one of the multiple user interface elements in an interactive display location on a display surface (e.g., at a bottom of the stack) and scrolling each user interface elements to that interactive display location in response to one or more detected user inputs. Where the interactive display location is located at the bottom of a display screen, a previously displayed user interface element may sequentially move to a top of the stack, or to a location within the stack immediately above the interactive display location, depending upon the user input scrolling direction (e.g., up or down, respectively). Alternatively, where the interactive location is located at the top of a display screen, a previously displayed user interface element may sequentially move to a bottom of the stack, or to a location within the stack immediately below the interactive display location, depending upon the user input scrolling direction (e.g., down or up, respectively). As such, the stacked column may be modulo scrolled repeatedly and interactively through each graphical menu pane. Any user interface element at the interactive display location may be interacted with by the user and in response to detection of additional user inputs. Within the present example, only a bottom graphical menu pane in the stack may have a control pane displayed in association with it. As such, the non-hierarchical options menu may form a right angle along a bottom or top corner of a display screen and may be modulo scrolled relative to the display location of the bottom graphical menu pane, as described above and in more detail below.

Further, auto-scrolling capabilities provide for automated modulo scrolling and automated adjustment of adjustable options in response to certain detected key inputs. For example, a LEFT arrow key may be assigned (e.g., as a configuration option or over time, for example, in response to detected user inputs) as a default key for rewinding audio/video content and/or a RIGHT arrow key may be assigned as a default key for fast forwarding audio/video content. Within this example, if a previous access to the non-hierarchical options menu resulted in adjustment of a video setting via a displayed video setting graphical menu pane, then detection of an UP arrow key or a DOWN arrow key may re-open the non-hierarchical options menu to the video setting graphical menu pane. However, detection of a LEFT arrow key or a RIGHT arrow key may cause the multiple media player device to automatically scroll the non-hierarchical options menu to a graphical menu pane associated with content rendering position adjustable option. If the detected key was a LEFT arrow key, the multiple media player device may begin to automatically rewind the content. Additionally, if the detected key was a RIGHT arrow key, the multiple media player device may begin to automatically fast forward the content. Therefore, by using a single key input associated with a portion of the full-screen content overlay options menu of the multiple media player device relating to a rewind (or other function), the associated portion of the full-screen content overlay options menu immediately appears without going through a sequence of keystrokes. Many other variations on automated scrolling and adjustable option adjustment are possible and all are considered within the scope of the present subject matter.

Based upon the description herein, the progressively rendered non-hierarchical options menu may be displayed with increasing quantities of information and settings options in response to sequences of detected input selections. Accordingly, the progressively rendered non-hierarchical options menu reduces screen clutter and allows a user to specifically request access to additional setting options. It is further understood that while the examples described herein represent the non-hierarchical options menu as a vertically stacked progressively rendered collection of translucent graphical menu panes, other variations are possible (e.g., a horizontal array of translucent graphical menu panes) and all such variations are considered within the scope of the present subject matter.

Turning now to FIG. 1, FIG. 1 is a diagram of an example of a system 100 including a media player device 102 that provides automated dynamic iconic setting indicators and an automated minimal and preferential option user interface for a television 104. While the present example illustrates the media player device 102 and the television 104 as separate components, the respective devices may be combined, as in the example of FIG. 2 below, without departure from the scope of the present subject matter. As such, a system, such as the system 100, may form a portion of a handheld consumer electronics device or other device without departure from the scope of the present subject matter.

A display 106 provides visual and/or other information to a user of the television 104. As can be seen from FIG. 1, a full-screen display image 108 is shown on the display 106. As will be described in more detail below, the present subject matter provides the automated dynamic iconic setting indicators and the automated minimal and preferential option user interface as a translucent overlay on top of the full-screen content to reduce interference and interruption of the rendered full-screen display image 108.

The display 106 may include any type of display device, such as a cathode ray tube (CRT), liquid crystal display (LCD), light emitting diode (LED), projection or other display element or panel. The display 106 may also include a touchscreen display, such as a touchscreen display associated with a handheld consumer electronics device that includes the media player 102 and a touchscreen input device.

An infrared input device 110 provides input capabilities for the user of the television 104 via a device, such as an infrared remote control device 112. For purposes of the present subject matter, it is understood that dedicated input keys on the remote control device 112 for accessing options and option settings are not required. However, dedicated input keys may be provided as appropriate for a given implementation.

An audio output device 114 provides audio output capabilities for the television 104, such as audio associated with rendered content. The audio output device 114 may include a pair of speakers, driver circuitry, and interface circuitry as appropriate for a given implementation.

A light emitting diode (LED) output module 116 provides one or more output LEDs and associated driver circuitry for signaling certain events or acknowledgements to a user of the television 104. Many possibilities exist for communicating information to a user via LED signaling and all are considered within the scope of the present subject matter.

Figure 2:
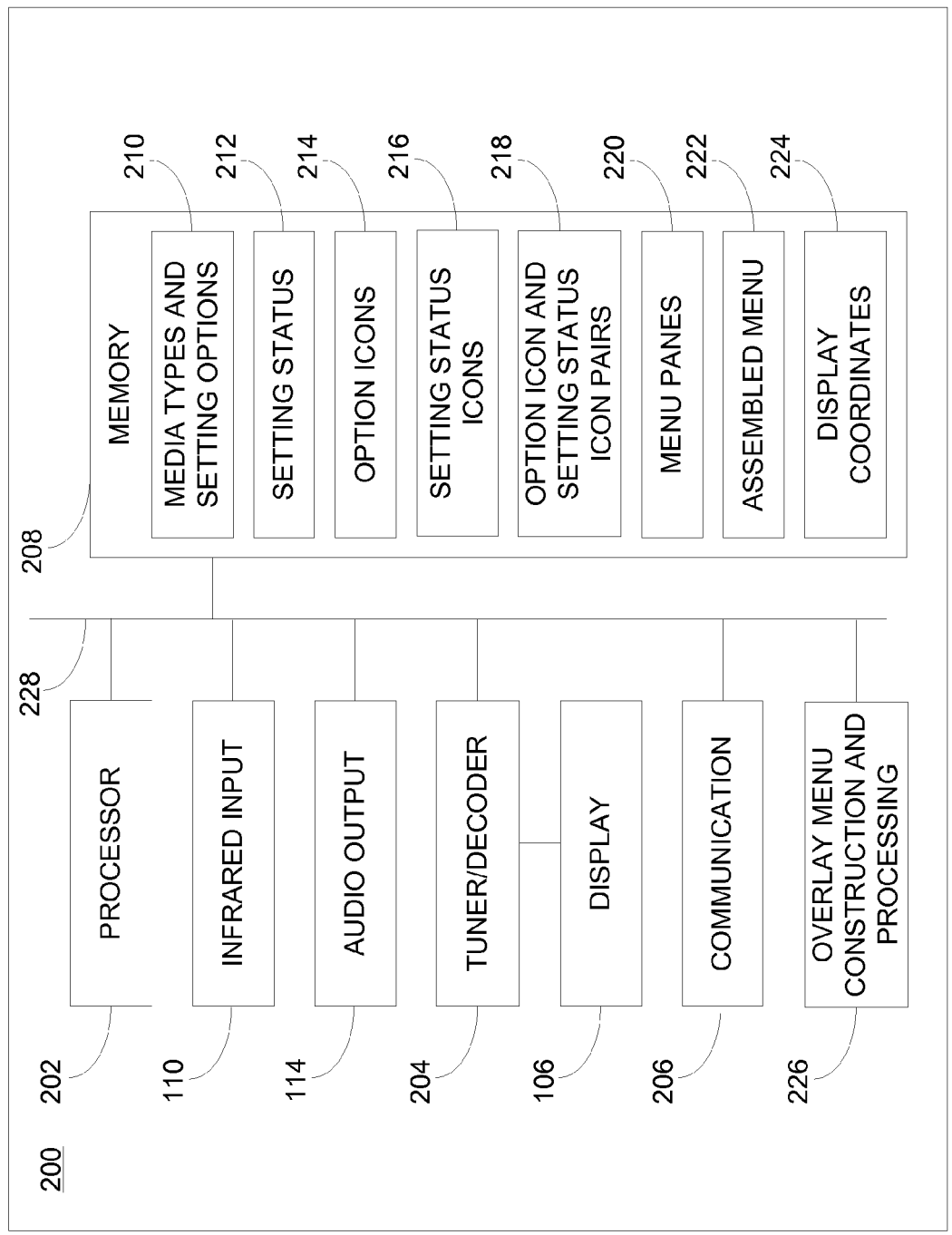
FIG. 2 is a block diagram of an example core processing module that provides automated dynamic iconic setting indicators and an automated minimal and preferential option user interface consistent with certain embodiments of the present invention.

FIG. 2 is a block diagram of an example core processing module 200 that provides automated dynamic iconic setting indicators and an automated minimal and preferential option user interface. As described above, the present subject matter may be performed via a device, such as the media player device 102, or the media player device 102 combined with a display device, such as the television 104. For purposes of the present example, the functionality of the media player device 102 and the television 104 are combined into the core processing module 200, such as a combined core module of a handheld consumer electronics device.

A processor 202 provides computer instruction execution, computation, and other capabilities within the core processing module 200. The infrared input device 110 is shown and again provides input capabilities for the user of the television 104 via a device, such as the infrared remote control device 112 (See FIG. 1).

The audio output device 114 is illustrated and again provides audio output capabilities for the core processing module 200. The audio output device 114 may include one or more speakers, driver circuitry, and interface circuitry as appropriate for a given implementation.

A tuner/decoder module 204 receives television (e.g., audio/video) content and decodes that content for display via the display 106. The content may include content formatted either via any of the motion picture expert group (MPEG) standards, or content formatted in any other suitable format for reception by the tuner/decoder module 204. The tuner/decoder module 204 may include additional controller circuitry in the form of application specific integrated circuits (ASICs), antennas, processors, and/or discrete integrated circuits and components for performing electrical control activities associated with the tuner/decoder module 204 for tuning to and decoding content received either via wireless or wired connections to the core processing module 200.

A communication module 206 may alternatively provide communication capabilities for the core processing module 200, such as for retrieval of still image content, audio and video content, or other content via a satellite, cable, storage media, the Internet, or other content provider, and other activities as appropriate for a given implementation. The communication module 206 may support wired or wireless standards as appropriate for a given implementation. Example wired standards include Internet video link (IVL) interconnection within a home network, for example, such as Sony Corporation's Bravia® Internet Video Link (BIVL™) Example wireless standards include cellular wireless communication and Bluetooth® wireless communication standards. Many other wired and wireless communication standards are possible and all are considered within the scope of the present subject matter.

A memory 208 includes a media types and setting options storage area 210. The media types and setting options storage area 210 may store information, such as available media types for rendering via the core processing module 200 and setting options associated with available media types associated with the present subject matter. Available media types may be updated periodically along with the associated setting options, such as via the communication module 206.

A setting status storage area 212 may store information, such as current settings for a currently accessed media type rendered via the core processing module 200. An option icons storage area 214 may store information, such as graphical icons for available setting options associated with available media types that may be rendered via the core processing module 200. A setting status icons storage area 216 may store information, such as graphical icons for available setting status configurations associated with available media types that may be rendered via the core processing module 200.

As described above and in more detail below, option icons and setting status icons may be paired and displayed in association with currently rendered content to provide detailed setting information with reduced screen area impact. As such, an option icon and setting status icon pairs storage area 218 may store information, such as paired option and setting status graphical icons for available setting options associated with available media types that may be rendered via the core processing module 200.

A menu panes storage area 220 may store information, such as translucent graphical menu panes and graphical control panes for use in association with icon pair display and adjustment controls display, respectively, associated with available media types that may be rendered via the core processing module 200. An assembled menu storage area 222 may store information, such as translucent graphical menu panes and graphical control panes associated with a current state of progressive display of a progressively rendered non-hierarchical options menu, as described above an in more detail below.

A display coordinates storage area 224 may store information, such as display coordinates for each menu pane or control pane associated with a current state of progressive display of a progressively rendered non-hierarchical options menu. As described above an in more detail below, graphical menu panes may be progressively created and populated in response to detected user inputs. Further, displayed menu panes may be modulo scrolled, either vertically or horizontally, as appropriate for a given implementation. As such, the display coordinates storage area 224 may store coordinate information for currently-rendered graphical menu and control panes.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

An overlay menu construction and processing module 226 is also illustrated. The overlay menu construction and processing module 226 provides creation and processing capabilities for the core processing module 200, as described above and in more detail below. The overlay menu construction and processing module 226 implements the automated dynamic iconic setting indicator and the automated minimal and preferential option user interface of the core processing module 200. It should be noted, however, that though the core processing module 200 and the overlay menu construction and processing module 226 are illustrated and described to provide both the automated dynamic iconic setting indicator and the automated minimal and preferential option user interface, this should not be considered limiting. A given implementation of the present subject matter may include either the automated dynamic iconic setting indicator or the automated minimal and preferential option user interface, without a requirement for implementation of both aspects of the present subject matter and without departure from the scope of the present subject matter.

It should be noted that the overlay menu construction and processing module 226, the tuner/decoder module 204, and the communication module 206 are illustrated as a component-level modules for ease of illustration and description purposes. It is also understood that each of these modules may include any hardware, programmed processor(s), and memory used to carry out the functions of the respective module. For example, each of the overlay menu construction and processing module 226, the tuner/decoder module 204, and the communication module 206 may include additional controller circuitry in the form of application specific integrated circuits (ASICs), processors, antenna(s), and/or discrete integrated circuits and components for performing electrical control activities associated with the respective module. Additionally, the overlay menu construction and processing module 226, the tuner/decoder module 204, and the communication module 206 may include interrupt-level, stack-level, and application-level modules as appropriate. Furthermore, the overlay menu construction and processing module 226, the tuner/decoder module 204, and the communication module 206 may include any memory components used for storage, execution, and data processing by these modules for performing processing activities associated with the respective module.

It should also be noted that the overlay menu construction and processing module 226 may form a portion of other circuitry described without departure from the scope of the present subject matter. Further, the overlay menu construction and processing module 226 may alternatively be implemented as an application stored within the memory 208. In such an implementation, the overlay menu construction and processing module 226 may include instructions executed by the processor 202 for performing the functionality described herein. The processor 202 may execute these instructions to provide the processing capabilities described above and in more detail below for the core processing module 200. The overlay menu construction and processing module 226 may form a portion of an interrupt service routine (ISR), a portion of an operating system, a portion of a browser application, or a portion of a separate application without departure from the scope of the present subject matter.

The processor 202, the infrared input device 110, the audio output device 114, the tuner/decoder module 204, the communication module 206, the memory 208, and the overlay menu construction and processing module 226 are interconnected via one or more interconnections shown as interconnection 228 for ease of illustration. The interconnection 228 may include a system bus, a network, or any other interconnection capable of providing the respective components with suitable interconnection for the respective purpose.

FIG. 3 through FIG. 6 below illustrate an example display sequence associated with the automated dynamic iconic setting indicators and the automated minimal and preferential option user interface as a translucent overlay on top of the full-screen content. Many other variations on the example display sequence are possible and all are considered within the scope of the present subject matter.

Figure 3:
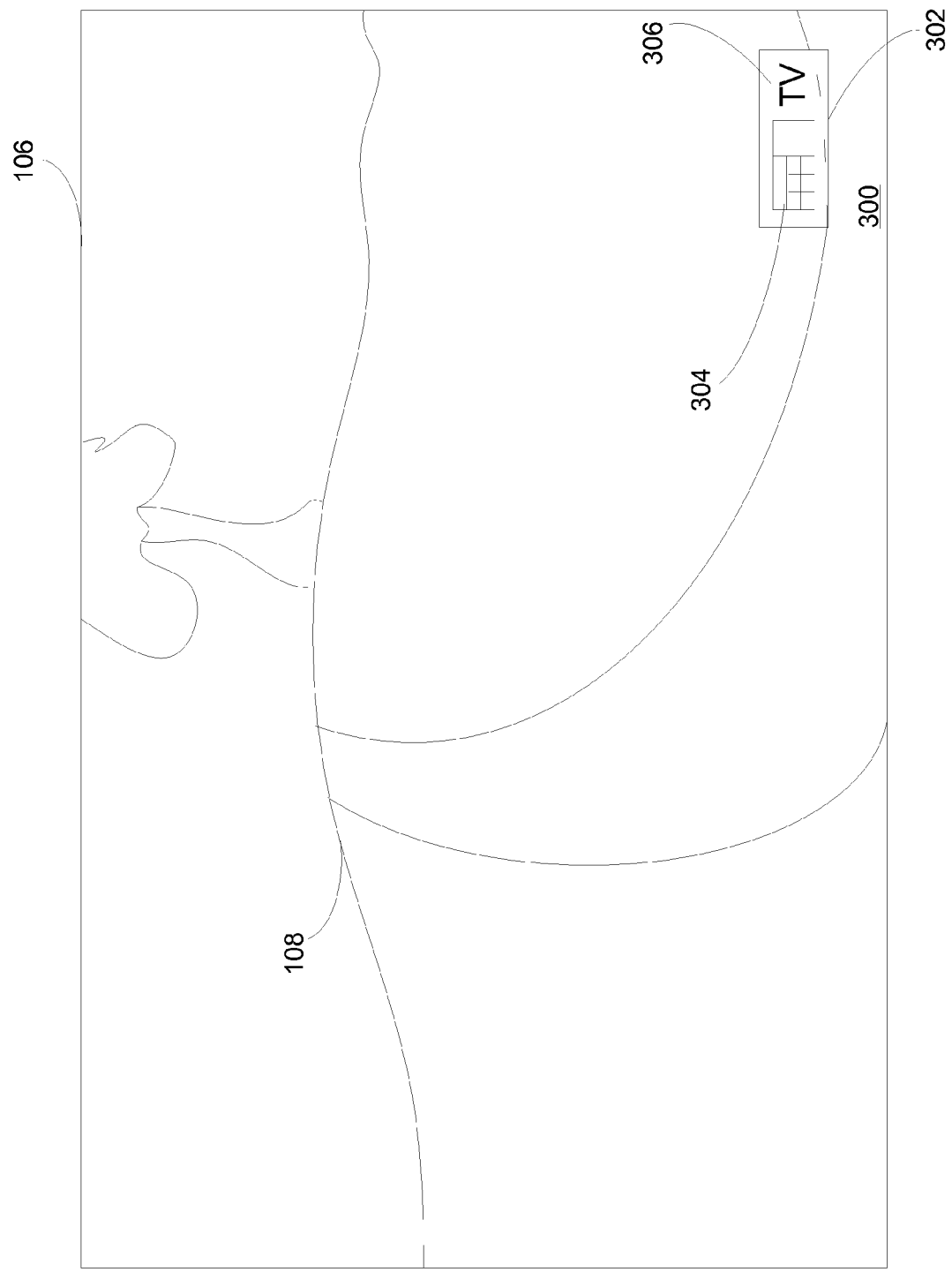
FIG. 3 is an illustration of an example of an implementation of a minimal and preferential option user interface for display of dynamic iconic setting indicators consistent with certain embodiments of the present invention.

FIG. 3 is an illustration of an example of an implementation of a minimal and preferential option user interface 300 for display of dynamic iconic setting indicators. As described above, a media type presently associated with the media player device 102 may be detected. For purposes of the present example, it is assumed that the media type detected is audio and video content received via a live audio/video feed. It is also assumed that a user of a remote control device, such as the remote control device 112, entered, for example, an UP arrow key, associated with the remote control device. However, a dedicated key or other input key may also have been selected. In either situation, the core processing module 200 detected the selection and recognized a request to display a portion of a full-screen content overlay options menu of the media player device 102.

In response to detecting the request, a graphical menu pane 302 that includes an option icon 304 that represents the adjustable option for the media player device 102 is displayed. A current setting status 306 represents the current setting status of television (e.g., "TV" within the present example). As such, within the present example, the media player device 102 is assumed to be accessing audio and video content via a broadcast medium (e.g., satellite, cable, open air signaling, etc.) and a television channel. In other situations, the media player device 102 may be accessing recorded digital video or streamed digital video received via a home or wide area network (e.g., the Internet). The option icon 304 is represented, within the present example, as a grid to intuitively provide an indication to a user that selections/adjustments of a selected channel or input source are possible.

As can also be seen from FIG. 3, the graphical menu pane 302 is translucent and a portion of the full-screen display image 108 can be seen through the graphical menu pane 302. The graphical menu pane 302 is also shown displayed within a lower right corner of the display 106. However, any other display location may be used, such as an upper right corner, a lower left corner, or an upper left corner without departure from the scope of the present subject matter.

By translucent display of the graphical menu pane 302 and by displaying the graphical menu pane 302 in a corner of the display 106, the graphical menu pane 302 reduces obstruction of the full-screen display image 108. The user may further interact with the minimal and preferential option user interface 300 to adjust a currently-selected television channel, input source, or to obtain more options, as described in more detail below. In addition, the degree of translucence may be a parameter that can be user controlled by a menu selection.

Figure 4:
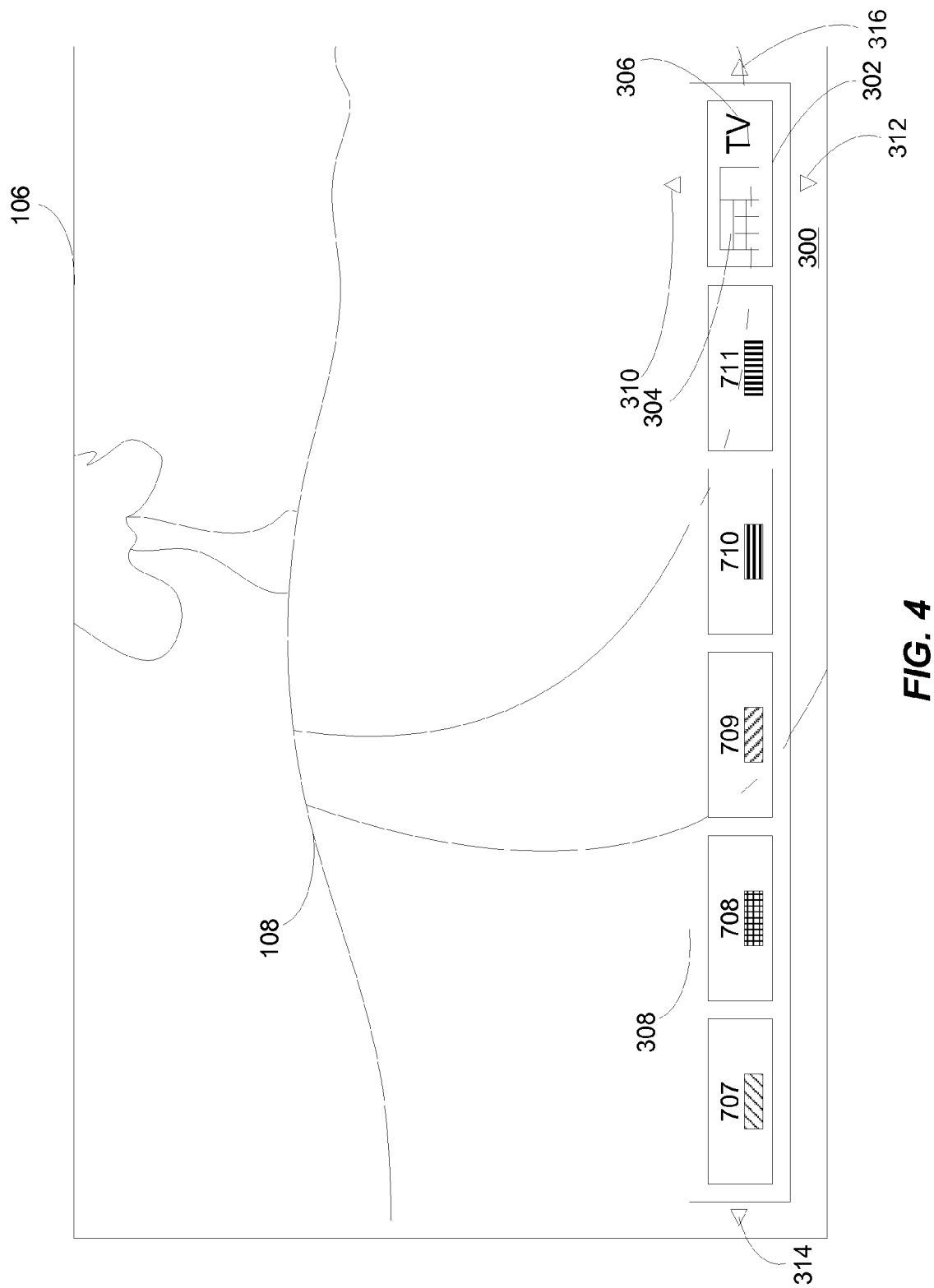
FIG. 4 is an illustration of a first example progression of an example of an implementation of the minimal and preferential option user interface of FIG. 3, including a control pane for adjustment of an option, consistent with certain embodiments of the present invention.

FIG. 4 is an illustration of a first example progression of an example of an implementation of the minimal and preferential option user interface 300 of FIG. 3, including a control pane 308 for adjustment of an option. Within the present example, the option that may be adjusted in association with the graphical menu pane 302 includes a channel/change adjustment option. As such, the control pane 308 includes several graphical channel option panes 707, 708, 709, 710, and 711. For purposes of the present example, each of the graphical channel option panes 707-711 represents a television channel that may be selected. Each of the graphical channel option panes 707-711 includes a channel logo (represented within FIG. 4 as a cross-hatched box without reference designators or actual broadcast station logos for ease of illustration).

An up arrow icon 310, a down arrow icon 312, a left arrow icon 314, and a right arrow icon 316 are also displayed in association with the control pane 308. As such, the user is intuitively notified that use of arrow keys associated with a remote control device, such as the remote control device 112, provides additional navigation options for the user in association with the minimal and preferential option user interface 300. For example, by use of either a RIGHT arrow key or a LEFT arrow key of a remote control device, again such as the remote control device 112, a user may scroll through the graphical channel option panes 707-711. It is further assumed for purposes of the present example that the graphical channel option panes 707-711 represent all available channel options and fit on the display 106. For implementations with a small display, such as a handheld consumer electronics device, or where more channel options are available, display area may be reduced by displaying a few graphical channel option panes and displaying an icon, such as the left arrow icon 314, to a left side of the available channel options. Many other variations on the present example are possible and all are considered within the scope of the present subject matter.

Where additional channels are available, additional graphical channel option panes may be presented and other of the graphical channel option panes 707-711 may be removed from the display 106 to reduce screen clutter and reduce obstruction of the full-screen display image 108. As with display of the graphical menu pane 302, the control pane 308 and the graphical channel option panes 707-711 are translucent and the full-screen display image 108 can be seen through the control pane 308 and through the graphical channel option panes 709, 710, and 711 within the present example.

It should be noted that the present example illustrates the graphical menu pane 302 displayed in response to a first detected user input and the control pane 308 displayed in response to a second detected user input for purposes of description. However, it is understood that the graphical menu pane 302 and the control pane 308 may be displayed concurrently in response to a single detected user input, as appropriate for a given implementation.

By use of either an UP arrow key or a DOWN arrow key of a remote control device, a user may indicate a request to view additional adjustable options, as described below beginning in association with FIG. 5. Accordingly, the minimal and preferential option user interface 300 detects user requests to provide an increasing number of options and adjustments for the detected media type presently associated with the media player device 102.

Figure 5:
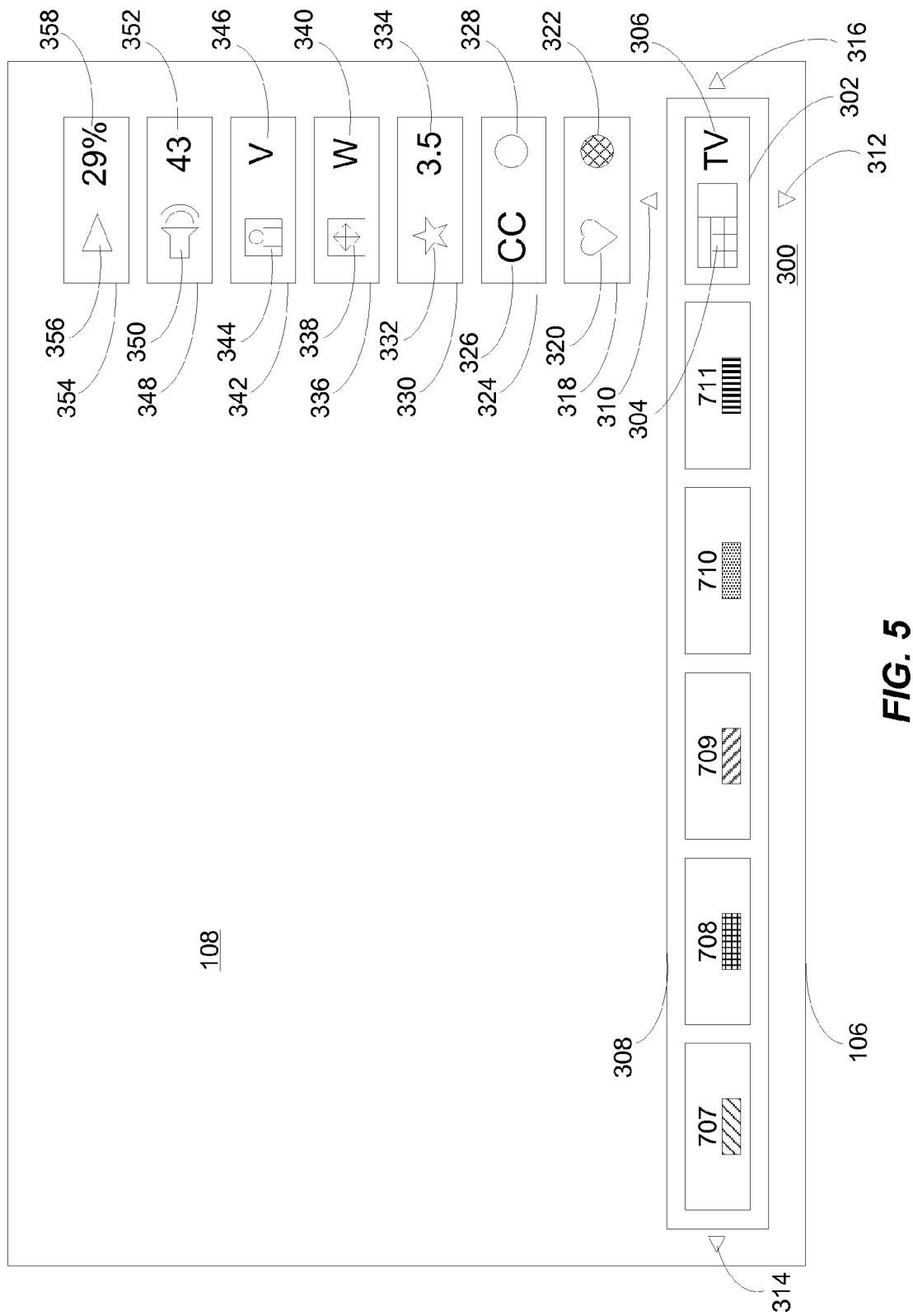
FIG. 5 is an illustration of a second example progression of an example of an implementation of the minimal and preferential option user interface of FIG. 4, including additional dynamic iconic setting indicators for additional adjustable options displayed in response to user input consistent with certain embodiments of the present invention.

FIG. 5 is an illustration of a second example progression of an example of an implementation of the minimal and preferential option user interface 300 of FIG. 4, including additional dynamic iconic setting indicators for additional adjustable options displayed in response to user input. The full-screen display image 108 is not shown within FIG. 5 to reduce drawing complexity, though the full-screen display image 108 reference designator is retained for clarity.

Within the present example, it is assumed that a user selection of either an UP arrow key or a DOWN arrow key of a remote control device was detected. In response to detection that a remote control key input representing either an UP arrow key or a DOWN arrow key has been depressed by a user, a stack of paired identified option icons and an associated current setting status of each adjustable option is displayed proximate to a vertical edge of the display 106. It is further assumed for purposes of the present example that dynamic iconic setting indicators for all available adjustable options fit on the display 106. For implementations with a small display, such as a handheld consumer electronics device, display area may be reduced by displaying a few dynamic iconic setting indicators and displaying an icon, such as the up arrow icon 310, above a partial stack of dynamic iconic setting indicators for available adjustable options. Many other variations on the present example are possible and all are considered within the scope of the present subject matter.

As described above, the choice of adjustable options is identified and selected for user adjustment via the minimal and preferential option user interface 300 based upon a media type that is detected to be presently accessed by the media player device 102. As also described above, the display of paired option icons and current setting status for available adjustable options reduces screen area requirements for display of options and provides real-time current setting status output so that a user may quickly determine a current setting of a given adjustable option for the currently-accessed media type. The current setting status may be changed, as described above, and a new current setting status may be displayed that dynamically changes in response to user adjustment of a given option. The current setting status of the available options may be displayed as a graphical output or text, as appropriate for a given implementation or option.

Within the present example, audio and video content includes certain representative adjustment options. Each adjustment option is represented by a translucent graphical menu pane. Certain options may include binary setting status options, such as enabled or disabled, on or off, etc. A favorites graphical menu pane 318 includes a favorites option icon 320 paired with a current favorites setting status 322. The current favorites setting status 322 may be displayed, for example, as a green circle (illustrated within the present example as a cross-hatched circle). A closed-caption graphical menu pane 324 includes a closed-caption option icon 326 paired with a current closed-caption setting status 328. A ratings graphical menu pane 330 includes a ratings option icon 332 paired with a current ratings setting status 334. The current ratings setting status 334 shows that the current audio and video content represented by is rated a three and a half (e.g., 3.5) out of a scale of zero (0) to five (5) within the present example.

A screen width graphical menu pane 336 includes a screen width option icon 338 paired with a current screen width setting status 340. The current screen width setting status 340 shows the user that the current setting status of the screen width adjustment is wide (e.g., W). A resolution graphical menu pane 342 includes a resolution option icon 344 paired with a current resolution setting status 346. The current resolution setting status 346 shows that the current setting is vivid (e.g., V).

A volume graphical menu pane 348 includes a volume option icon 350 paired with a current volume setting status 352. The current volume setting status 352 shows that the volume is currently adjusted to forty-three percent (43%) of a maximum volume setting. A play point graphical menu pane 354 includes a play point option icon 356 paired with a current play point setting status 358. The current play point setting status 358 shows that the currently selected audio and video content is at a twenty-nine percent (29%) completion from a beginning of the content. Each of the volume setting status and the current play point setting status may be considered a proportional setting status for purposes of the present description, including a numeral followed by a percent sign.

By use of either an UP arrow key or a DOWN arrow key of a remote control device, a user may indicate a request to scroll the displayed adjustment options, as described below beginning in association with FIG. 6. Accordingly, the minimal and preferential option user interface 300 detects user requests to navigate to additional displayed adjustment options for the detected media type presently associated with the media player device 102.

Figure 6:
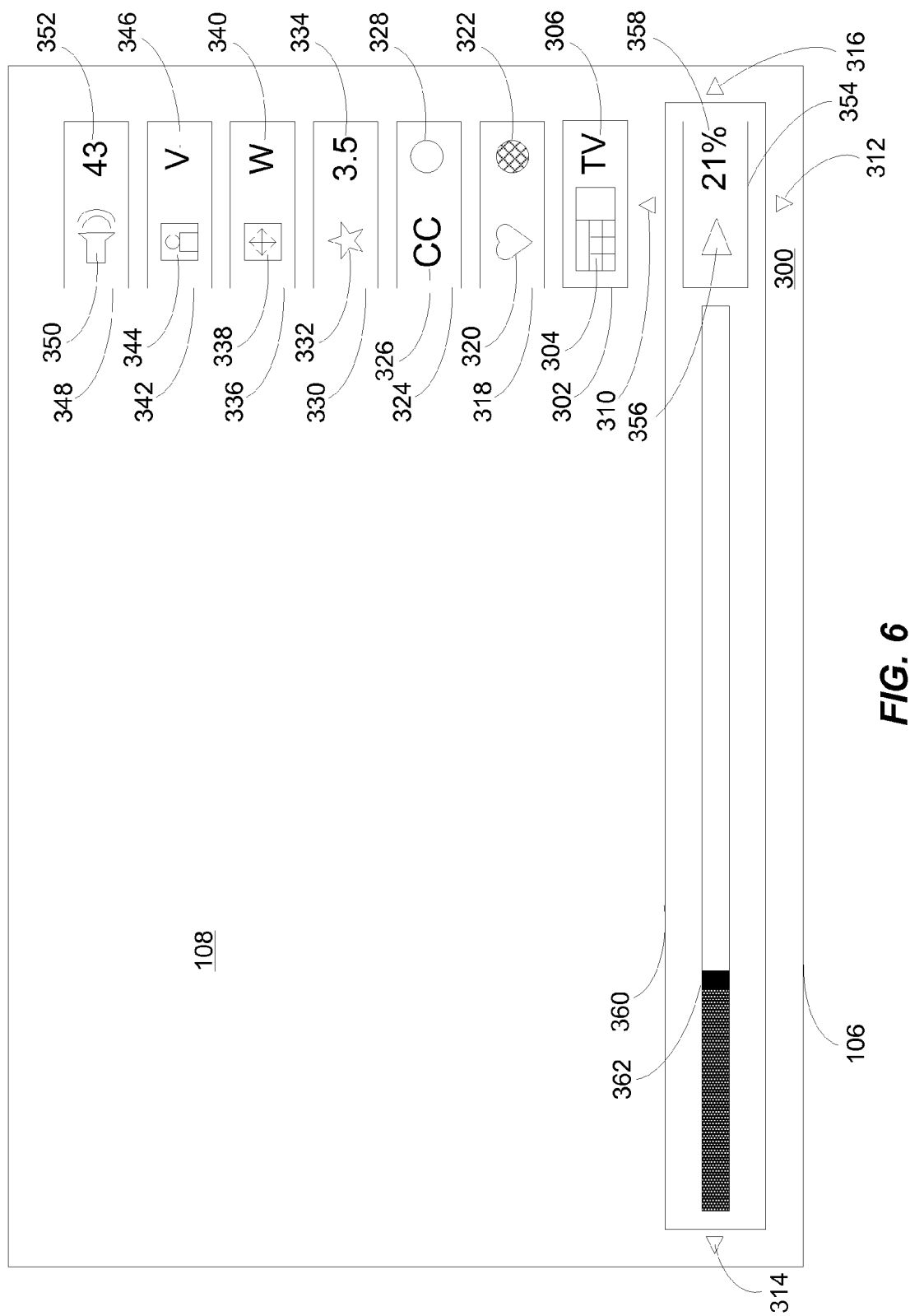
FIG. 6 is an illustration of a third example progression of an example of an implementation of the minimal and preferential option user interface of FIG. 5 that has been vertically modulo scrolled (e.g., rotated) in response to detection of user input consistent with certain embodiments of the present invention.

FIG. 6 is an illustration of a third example progression of an example of an implementation of the minimal and preferential option user interface 300 of FIG. 5 that has been vertically modulo scrolled (e.g., rotated) in response to detection of user input. For purposes of the present example, it is assumed that detection of either one DOWN arrow key input or seven UP arrow key presses were detected. In response to detection of each respective input key, the minimal and preferential option user interface 300 is scrolled in a modulo manner (e.g., one time for each input) to allow the user an opportunity to adjust each available adjustable option. A control pane may be displayed to a side, within the present example to a left side, of each graphical menu pane as the minimal and preferential option user interface 300 is displayed.

A control pane 360 includes a play point control element 362 that graphically represents the current play point location. It is further assumed that in response to display of the play point graphical menu pane 354 and the control pane 360, a user input of a LEFT arrow key was detected and that content rendering rewind was performed in response to the detected input to a display location of twenty-one percent (21%). It is additionally assumed that detection of the LEFT arrow key terminated when the content rewind reached the twenty-one percent (21%) play point. It is noted that the current play point setting status 358 may be updated in real time during rewind or fast forward operations to reflect each incremental change to the current play point, ending at the twenty-one percent (21%) within the present example.

Accordingly, the minimal and preferential option user interface 300 reduces obstruction of the full-screen content by displaying an overlay user interface menu as a stack of the paired identified option icons and the associated current setting status of each adjustable option proximate to a vertical edge of the display. It is noted that where an initial graphical menu pane is displayed at another corner of a display device, the stack of paired identified option icon and the associated current setting status may be displayed either horizontally or vertically in relation to the initial graphical menu pane display location.

Further, where the display device is a touchscreen device, detection of user contact with a surface of certain portions of the display device, such as display locations proximate to the graphical elements described above, may cause the menu display and adjustments described above. Many other variations on the menu organization and display options described above are possible and all are considered within the scope of the present subject matter.

FIG. 7 through FIG. 11 below describe example processes that may be executed by such devices, such as the media player device 102, to perform the automated dynamic iconic setting indicators and the automated minimal and preferential option user interface associated with the present subject matter. Many other variations on the example processes are possible and all are considered within the scope of the present subject matter. The example processes may be performed by modules, such as the overlay menu construction and processing module 226 and/or executed by the processor 202, associated with such devices. It should be noted that time out procedures and other error control procedures are not illustrated within the example processes described below for ease of illustration purposes. However, it is understood that all such procedures are considered to be within the scope of the present subject matter.

Figure 7:
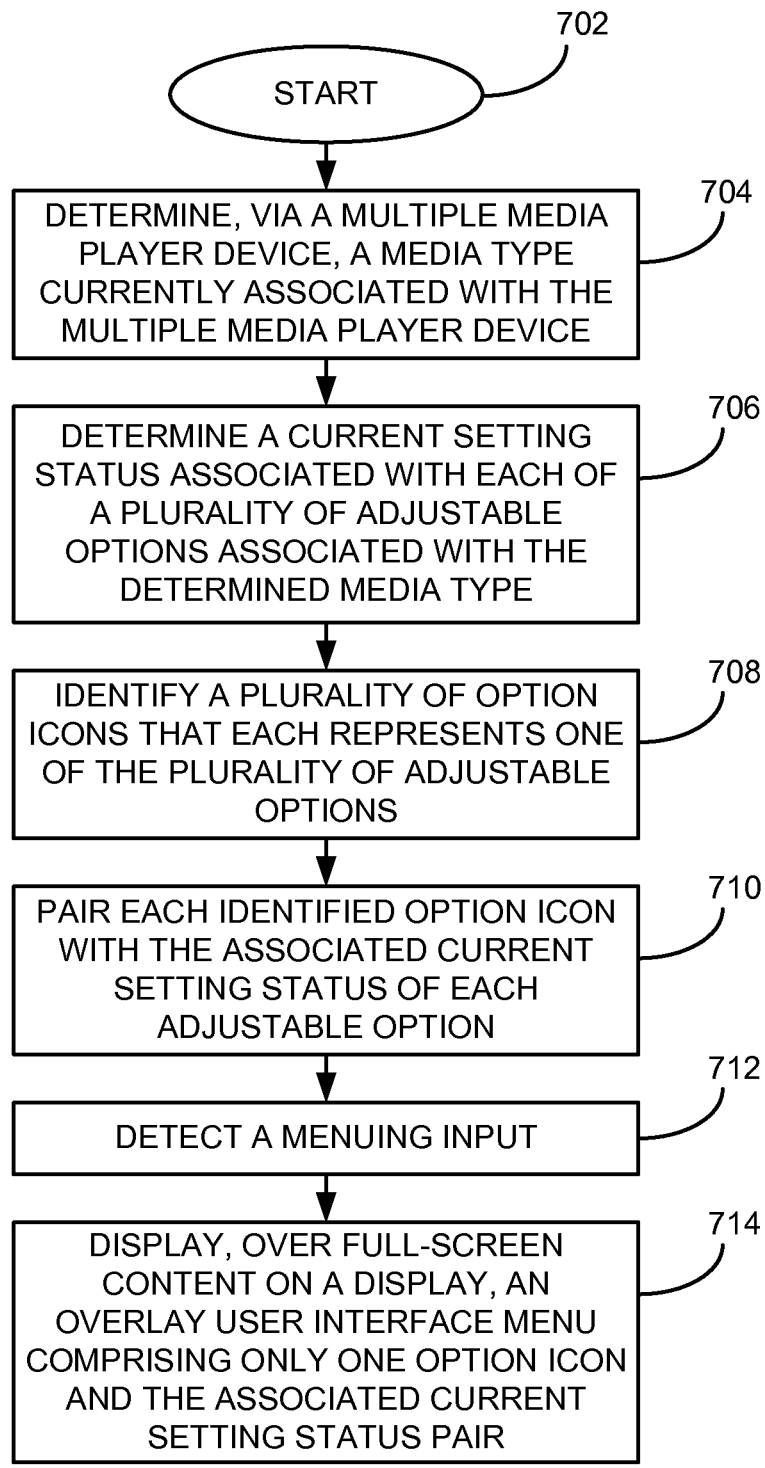
FIG. 7 is a flow chart of an example of an implementation of a process that provides automated dynamic iconic setting indicators consistent with certain embodiments of the present invention.

FIG. 7 is a flow chart of an example of an implementation of a process 700 that provides automated dynamic iconic setting indicators. The process 700 starts at 702. At block 704, the process 700 determines, via a multiple media player device, a media type currently associated with the multiple media player device. At block 706, the process 700 determines a current setting status associated with each of a plurality of adjustable options associated with the determined media type. At block 708, the process 700 identifies a plurality of option icons that each represents one of the plurality of adjustable options. At block 710, the process 700 pairs each identified option icon with the associated current setting status of each adjustable option. At block 712, the process 700 detects a menuing input. At block 714, the process 700 displays, over full-screen content on a display, an overlay user interface menu comprising only one option icon and the associated current setting status pair.

Figure 8:
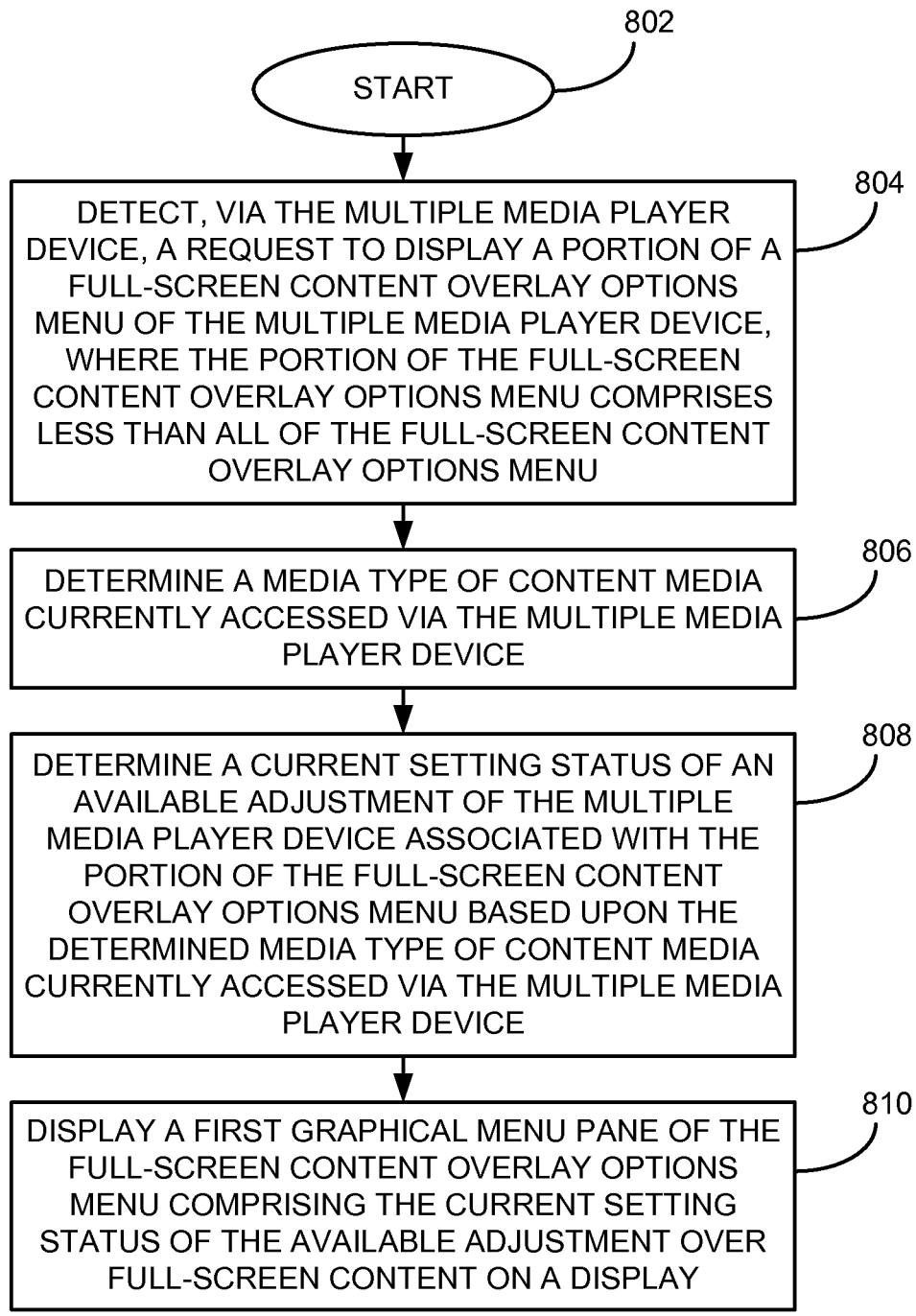
FIG. 8 is a flow chart of an example of an implementation of a process that provides an automated minimal and preferential option user interface consistent with certain embodiments of the present invention.

FIG. 8 is a flow chart of an example of an implementation of a process 800 that provides an automated minimal and preferential option user interface. The process 800 starts at 802. At block 804, the process 800 detects, via the multiple media player device, a request to display a portion of a full-screen content overlay options menu of the multiple media player device, where the portion of the full-screen content overlay options menu comprises less than all of the full-screen content overlay options menu. At block 806, the process 800 determines a media type of content media currently accessed via the multiple media player device. At block 808, the process 800 determines a current setting status of an available adjustment of the multiple media player device associated with the portion of the full-screen content overlay options menu based upon the determined media type of content media currently accessed via the multiple media player device. At block 810, the process 800 displays a first graphical menu pane of the full-screen content overlay options menu comprising the current setting status of the available adjustment over full-screen content on a display.

Figure 9A:
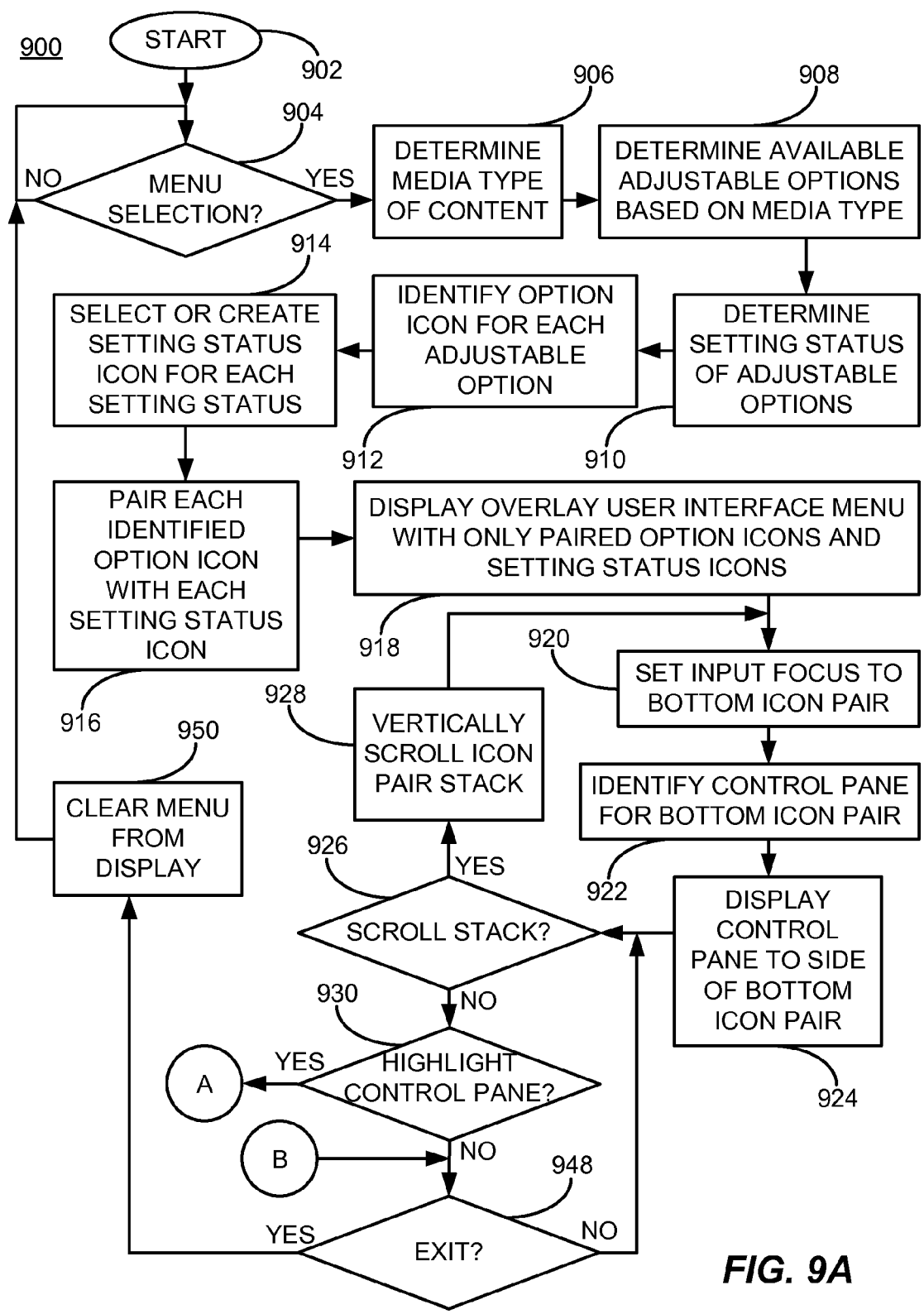
FIG. 9A is a flow chart of an example of initial processing of an implementation of process for automated dynamic iconic setting indicators consistent with certain embodiments of the present invention.
Figure 9B:
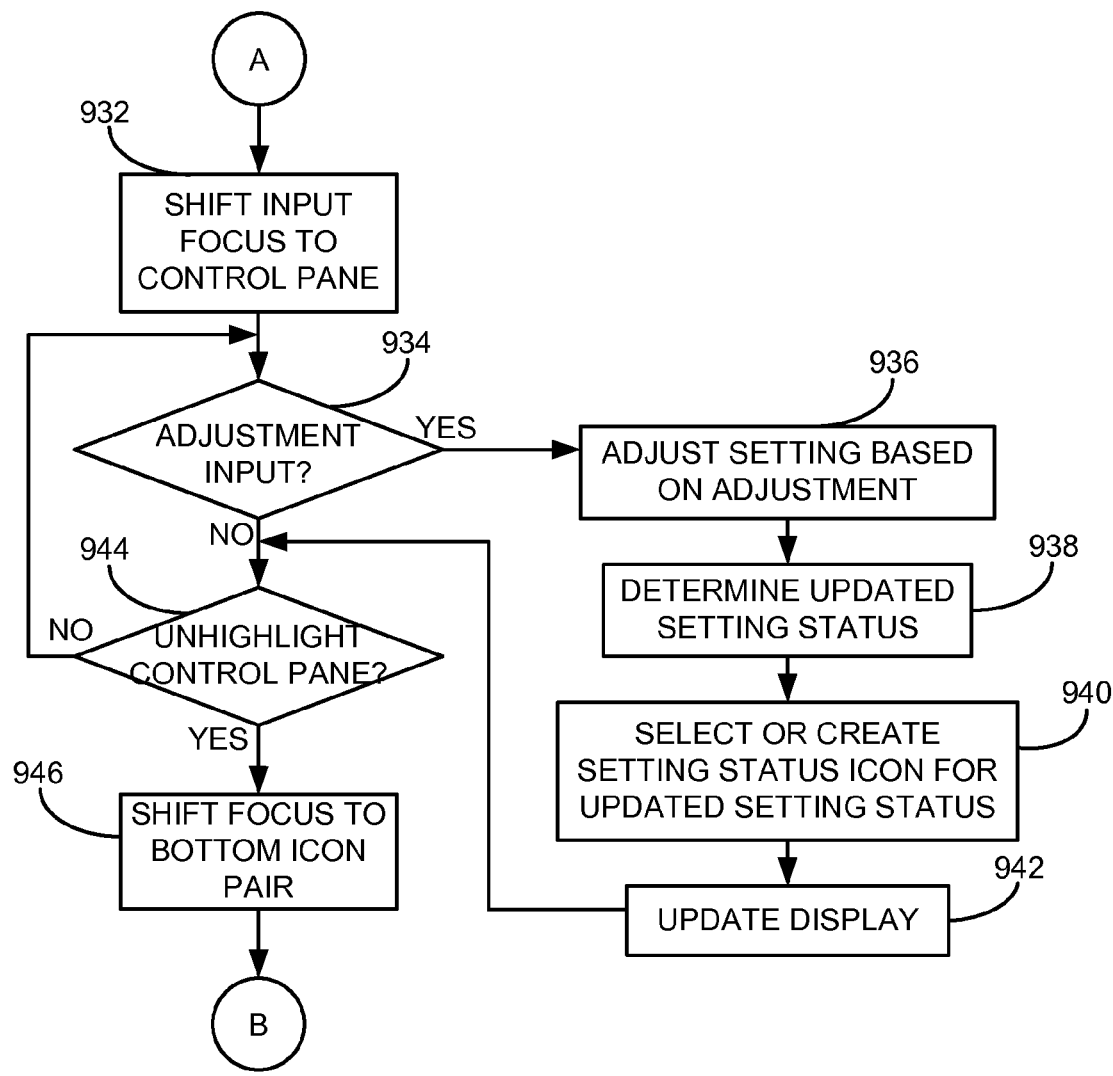
FIG. 9B is a flow chart of an example of additional processing of an implementation of process for automated dynamic iconic setting indicators consistent with certain embodiments of the present invention.

FIGS. 9A-9B illustrate a flow chart of an example of an implementation of process 900 for automated dynamic iconic setting indicators. FIG. 9A illustrates initial processing within the process 900. The process 900 starts at 902. At decision point 904, the process 900 makes a determination as to whether a menu selection has been detected. As described above, a menu selection may be detected in association with detection of user input from a remote control device or touchscreen display. That input may include detection of a dedicated key input or an arrow key input of the remote control device or detection of user contact of the display surface of a touchscreen display.

In response to determining that a menu selection has been detected at decision point 904, the process 900 determines a media type of the content currently being accessed at block 906. At block 908, the process 900 determines available adjustable options based upon the determined media type that is currently being accessed. At block 910, the process 900 determines a setting status of the available options for the media type. At block 912, the process 900 identifies an option icon for each adjustable option. At block 914, the process 900 selects or creates a setting status icon for each setting status. As described above, a current status for each adjustable option may be displayed as an icon. For adjustable options with a limited number of status options, icons may be stored and selected. Storage and selection of setting status icons may also be utilized for implementations with sufficient memory for storage of setting status icons for adjustable options with a large number of status options. Alternatively, setting status icons may be created dynamically in response to the determined setting status of any given adjustable option. For example, where a setting status is represented as a percentage, a setting status icon may be created based upon the determined percentage.

Figure 10:
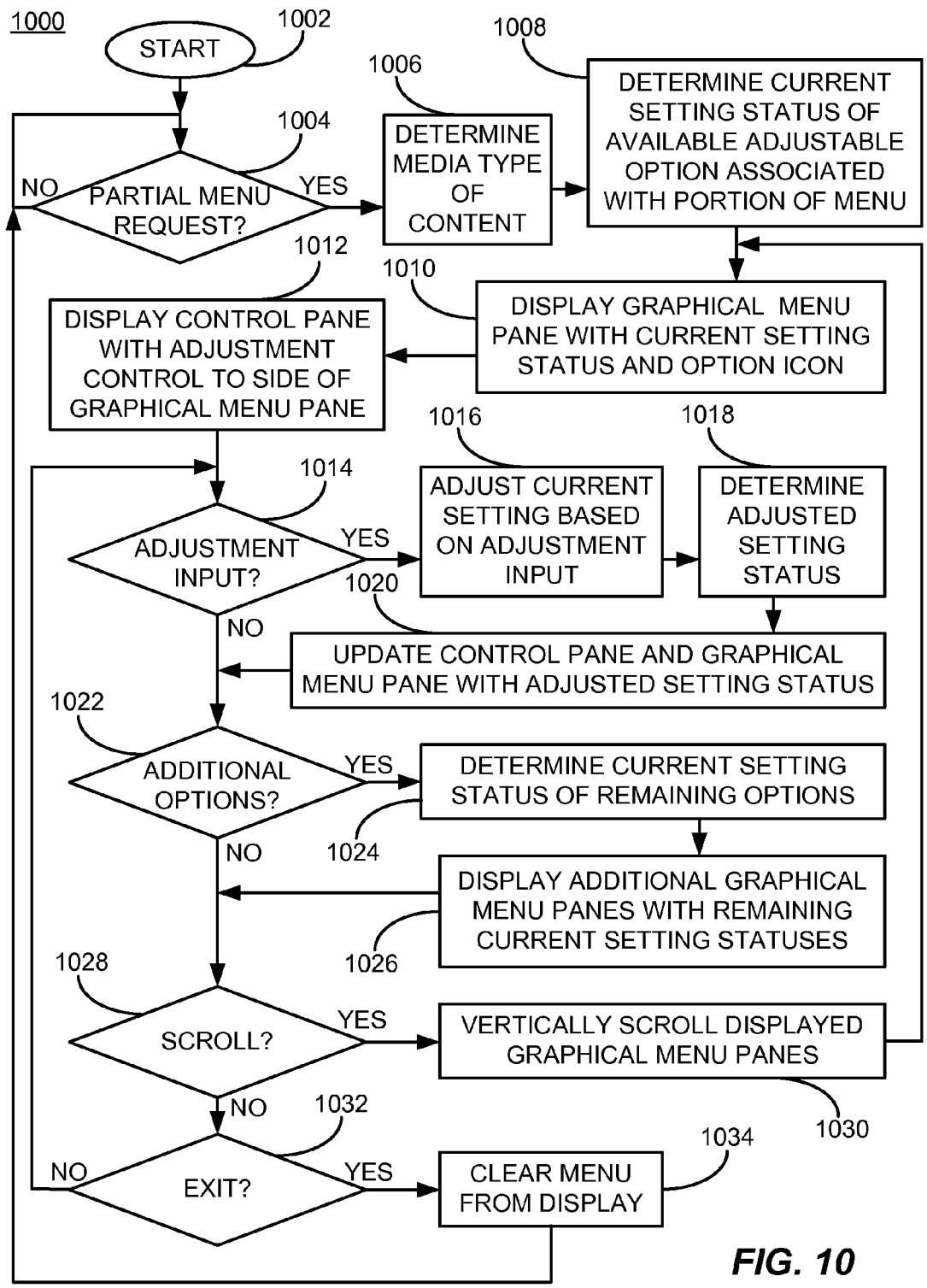
FIG. 10 is a flow chart of an example of an implementation of a process that provides an automated minimal and preferential option user interface consistent with certain embodiments of the present invention.

At block 916, the process 900 pairs each identified option icon with each associated setting status icon. At block 918, the process 900 displays an overlay user interface menu with only the paired option icons and setting status icons. It should be noted that, as described above, display of the overlay user interface menu may be progressive in response to user input. The progressive nature of the display of the paired option icon and setting status icons is omitted from the process 900 for ease of description. FIG. 10 described below further illustrates the progressive display processing associated with the present subject matter. As such, for purposes of the description of the process 900, one or more pairs of identified option icons and setting status icons may be displayed. Where more than one pair of option icons and setting status icons are displayed, they may be displayed in a stacked relationship or otherwise as described above.

At block 920, the process 900 sets an input focus to a bottom icon pair within the displayed overlay user interface menu. At block 922, the process 900 identifies a control pane for the bottom icon pair. At block 924, the process 900 displays the identified control pane to a side of the bottom icon pair. As described above, where the stacked overlay user interface menu is displayed along a right side of a display device, the control pane may be displayed to a left side of the bottom icon pair, or alternatively as appropriate for a given implementation.

At decision point 926, the process 900 makes a determination as to whether user input has been detected that indicates a request to scroll the stacked pair option icons and setting status icons. As described above, user input indicative of a request to scroll the stacked icon pairs may include an UP arrow key input or a DOWN arrow key input for a vertically-stacked overlay user interface menu. Alternatively, for a touchscreen implementation, detection of user contact in an area of a display surface relative to displayed portions of the overlay user interface menu may be detected and processed to indicate a user request to scroll the stacked icon pairs.

In response to determining that a user input indicating a request to scroll the vertically-stacked overlay user interface menu has been detected, the process 900 vertically scroll the icon pair stack at block 928. The process 900 returns to block 920 and iterates as described above.

Returning to the description of decision point 926, in response to determining that user input indicating a request to scroll the stacked icon pairs has not been detected, the process 900 makes a determination at decision point 930 as to whether a request to highlight the displayed control pane has been detected. As described above, a request to highlight the displayed control pane may be detected in association with detection of a LEFT arrow key input or a touchscreen input in an area associated with the displayed control pane.

In response to determining that a request to highlight the displayed control pane has been detected at decision point 930, the process 900 transitions to the processing shown and described in association with FIG. 9B.

FIG. 9B illustrates additional processing associated with the process 900 for automated dynamic iconic setting indicators. At block 932, the process 900 shifts input focus to the displayed control pane. At decision point 934, the process 900 makes a determination as to whether an adjustment input has been detected. As described above, an adjustment input may include, for example, a LEFT arrow key input associated with rewinding rendered content or a touchscreen input to a left side of a play point control element, such as the play point control element 362. Alternatively, an adjustment input may include, for example, a LEFT arrow key input followed by a SELECT key input or other input sequence as appropriated for a given implementation. Accordingly, a variety of user inputs and user input sequences may be detected in association with the determination at decision point 934 as to whether an adjustment input has been detected based upon the given adjustment option associated with the currently-displayed control pane.

In response to determining at decision point 934 that an adjustment input has been detected, the process 900 adjusts the selected setting based upon the detected adjustment at block 936. At block 938, the process 900 determines an updated setting status for the option based upon the adjustment. At block 940, the process 900 selects or creates a setting status icon for the updated setting status. At block 942, the process 900 updates the display of the current setting status with the selected or created setting status icon.

In response to determining at decision point 934 that an adjustment input has not been detected, or upon updating the display of the current setting status with the selected or created setting status icon at block 942, the process 900 makes a determination at decision point 944 as to whether a request to un-highlight the displayed control pane has been detected. For example, one or more RIGHT arrow key inputs may be detected or a touchscreen input to a display area associated with the bottom icon pair, resulting in navigation within the displayed overlay user interface menu back to the bottom icon pair. In response to determining that a request to un-highlight the control pane has not been detected, the process 900 returns to decision point 934 and iterates as described above.

In response to determining that a request to un-highlight the control pane has been detected at decision point 944, the process 900 shifts focus to the bottom icon pair at block 946. The process 900 transitions back to the processing described within FIG. 9A.

At decision point 948, the process 900 makes a determination as to whether a request to exit the displayed menu has been detected. A request to exit the displayed menu has been detected for example, in response to detection of an EXIT key input from a remote control device or detection of a touchscreen input in an area of a display screen surface, such as a corner of the display screen surface diagonally opposite a display corner of the bottom icon pair. Many other possibilities exist for detection of a request to exit the displayed menu and all are considered within the scope of the present subject matter. In response to determining that a request to exit the displayed menu has not been detected, the process 900 returns to decision point 926 and iterates as described above. In response to determining that a request to exit the displayed menu has been detected, the process 900 clears the menu from the display at block 950. The process 900 returns to decision point 904 to await detection of a new user input associated with menu selection.

Accordingly, the process 900 determines a media type currently accessed by a media player device and determines available adjustable options based upon the media type. Option icons for each available adjustable option are paired with associated setting status icons representing current setting status of each adjustable option. The process 900 iteratively processes adjustment inputs for the adjustable options and updates the current setting status in real time.

FIG. 10 is a flow chart of an example of an implementation of a process 1000 that provides an automated minimal and preferential option user interface. The process 1000 starts at 1002. At block 1004, the process 1000 makes a determination as to whether a partial menu request has been received. As described above, a partial menu request may be a request to display a single option icon and current setting status icon pair. When a determination is made a decision point 1004 that a partial menu request has been detected, the process 1000 determines a media type of the content currently accessed at block 1006. At block 1008, the process 1000 determines a current setting status of the available adjustable option associated with the requested portion of the menu. The current setting status may be a default setting status, such as volume, or other preferential setting status as appropriate for a given implementation.

At block 1010, the process 1000 displays a graphical menu pane with the current setting status and the associated option icon. As described above, the current setting status may be populated or a current setting status icon may be created or selected to represent the current setting status. At block 1012, the process 1000 displays a control pane with an adjustment control to a side of the graphical menu pane.

At decision point 1014, the process 1000 makes a determination as to whether an adjustment input has been detected. An adjustment input may be detected in response to a variety of user inputs as described above in association with other user inputs. In response to determining that an adjustment input has been detected, the process 1000 adjusts the current setting based upon the detected adjustment input at block 1016. At block 1018, the process 1000 determines an adjusted setting status based upon the adjustment. At block 1020, the process 1000 updates the control pane and the graphical menu pane with the adjusted setting status.

In response to updating the control pane at block 1020 or in response to determining that an adjustment input has not been detected at decision point 1014, the process 1000 makes a determination at decision point 1022 as to whether an additional options request has been detected. Detection of a request for additional options may include detection of an UP arrow key or a DOWN arrow key detection, or a touchscreen input associated with a display screen area above the displayed graphical menu pane. In response to determining that an additional options request has been detected at decision point 1022, the process 1000 determines a current setting status of remaining options based upon the currently-accessed media type at block 1024. At block 1026, the process 1000 displays additional graphical menu panes with remaining current setting statuses for each additional adjustable option.

In response to displaying the additional graphical menu panes at block 1026, or in response to determining that an additional options request has not been detected at decision point 1022, the process 1000 makes a determination at decision point 1028 as to whether a request to scroll the displayed additional graphical menu panes has been detected. A request to scroll the displayed additional menu panes may include an UP arrow key or a DOWN arrow key detection. This input to request scrolling of the displayed additional graphical menu panes may further be the same as the input key detection for determining whether additional options have been requested. As such, a reduced number of input keys may be utilized to perform the respective operations. The request to scroll the displayed additional menu panes may include a touchscreen input associated with a display screen area above the displayed additional menu panes or associated with a displayed icon, such as the up arrow icon 310 or the down arrow icon 312.

In response to determining that a request to scroll the displayed additional graphical menu panes has been detected at decision point 1028, the process 1000 vertically scrolls the displayed graphical menu pane at block 1030. The process 1000 returns to block 1010 to display a new graphical menu pane and block 1012 to display a new control pane associated with a new bottom graphical menu pane within the vertical stack, and iterates as described above.

In response to determining at decision point 1028 that a request to scroll the displayed additional graphical menu panes has not been detected, the process 1000 makes a determination at decision point 1032 as to whether a request to exit the options menu has been detected. In response to determining that a request to exit the displayed options menu has not been detected, the process 1000 returns to decision point 1014 and iterates as described above. In response to determining that a request to exit the displayed options menu has been detected at decision point 1032, the process 1000 clears the menu from the display at block 1034, and returns to decision point 1004 to await a request for a new partial menu display.

As such, the process 1000 initially displays a minimal portion of a user interface. The minimal portion initially displayed may be preferential with respect to either a last option adjusted or a dedicated default adjustment option, such as volume, or another preferential option as appropriate for a given implementation. The process 1000 incrementally provides more available adjustment options in response to user requests. As such, the minimal and preferential option user interface allows a user to quickly navigate to preferential options or additional options without use of extensive display area or user input processing.

Figure 11:
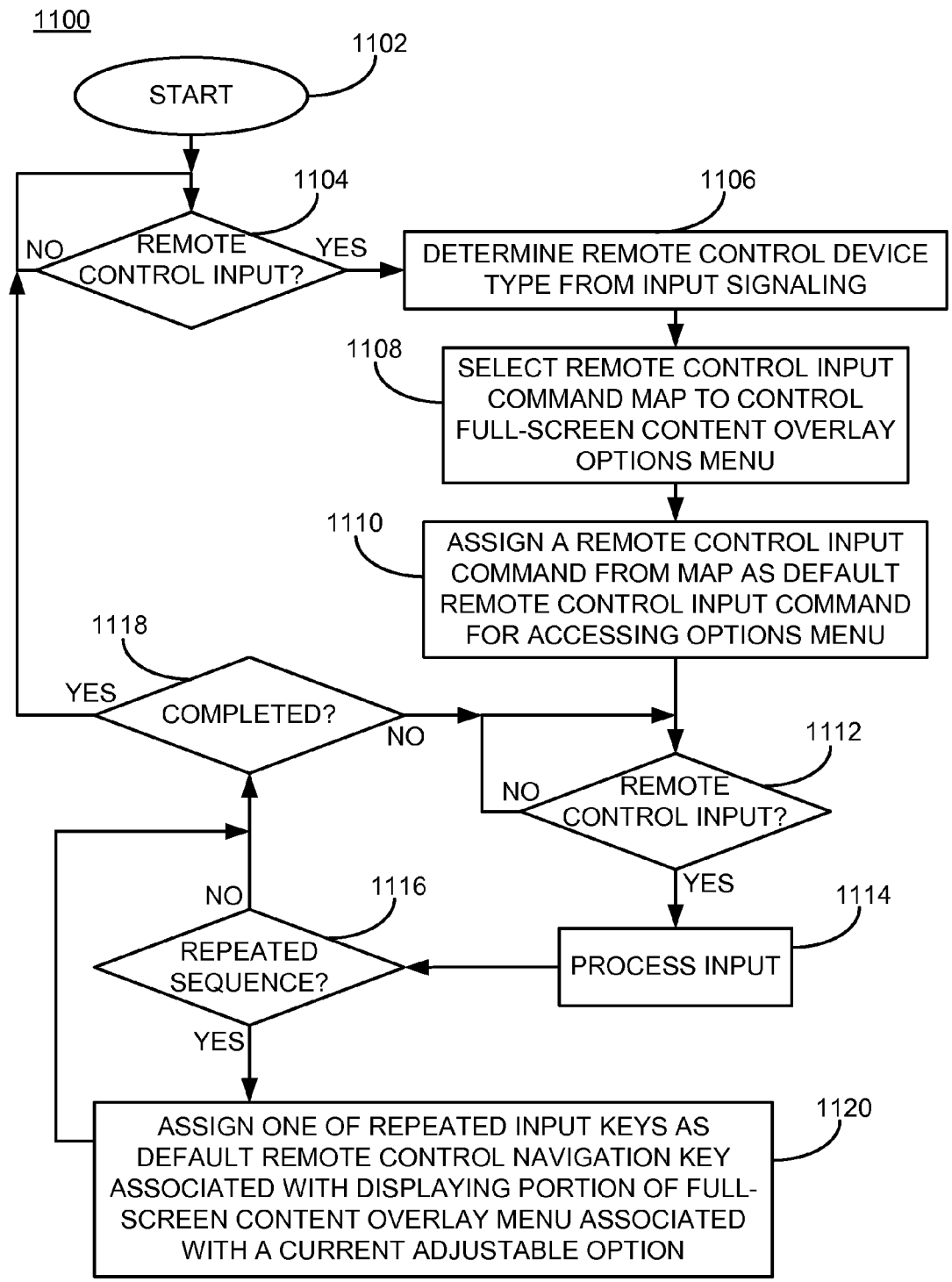
FIG. 11 is a flow chart of an example of an implementation of a process that provides automated preferential input sequence learning consistent with certain embodiments of the present invention.

FIG. 11 is a flow chart of an example of an implementation of a process 1100 that provides automated preferential input sequence learning. Detailed descriptions of input variations are omitted from the present example for ease of description purposes. However, it is understood that a variety of input options are possible, as described above, and all are considered within the scope of the present subject matter. The process 1100 starts at 1102. At decision point 1104, the process 1100 makes a determination as to whether a remote control device input has been detected. In response to determining that a remote control device input has been detected, the process 1100 determines a remote control device type from the input signaling that has been detected at block 1106. At block 1108, the process 1100 selects a remote control input command map to control a full-screen content overlay options menu. At block 1110, the process 1100 assigns a remote control input command from the selected map as a default remote control input command for accessing the full-screen content overlay options menu.

At decision point 1112, the process 1100 makes a determination as to whether an additional remote control device input has been detected. In response to determining that an additional remote control device input has been detected, the process 1100 processes that input at block 1114. As described above, a remote control device input may include a dedicated key or a general input key, such as an arrow key, or other key as appropriate for a given implementation.

At decision point 1116, the process 1100 makes a determination as to whether a repeated sequence of key inputs associated with navigating to specific adjustable options associated with the media type currently accessed has been detected. It is understood that the process 1100 may iterate for a number of times until a repeated sequence is detected at decision point 1116. As such, in response to determining that a repeated sequence has not been detected, the process 1100 makes a determination at decision point 1118 as to whether input processing has been completed. In response to determining that input processing has not been completed, the process 1100 returns to decision point 1112 to detect and iteratively process additional remote control device inputs.

Returning to the description of decision point 1116, in response to determining that a repeated sequence of a remote control device input key has been detected, the process 1100 assigns one of the repeated input keys as a default remote control navigation key associated with displaying a portion of the full-screen content overlay menu associated with a current adjustable option at block 1120. The process 1100 returns to decision point 1118 and iterates as described above. In response to determining at decision point 1118 that input processing has been completed, the process 1100 returns to decision point 1104 to await a new remote control device input. It is understood that the processing described above associated with determining a remote control device type, selecting a remote control input command map, and assigning a remote control input command from the command map as a default input may be performed during a first execution of the process 1100 and may be omitted from subsequent executions of the process 1100. This processing is described in association with the process 1100 for clarity with respect to this particular aspect.

As such, the process 1100 initially assigns a remote control input command from a selected remote control input command map associated with the remote control device for accessing an options menu. The process 1100 detects repeated sequences of input keys for navigation to specific available adjustable options and assigns a single key as a default remote control navigation key for navigating to the associated adjustable option. Though not depicted within FIG. 11 for ease of illustration purposes, a display output may also be provided that informs the user of the assigned input key for the respective adjustable option.

Thus, in accord with certain implementations, a method of dynamically populating a user interface in response to user inputs of a multiple media player device involves detecting, via a multiple media player device, a request to display a portion of a full-screen content overlay options menu of the multiple media player device including one of a remote control device up arrow key input and a remote control device down arrow key input, where the portion of the full-screen content overlay options menu includes less than all of the full-screen content overlay options menu; determining a media type of content media currently accessed via the multiple media player device; determining a current setting status of a default available adjustment of the multiple media player device associated with the portion of the full-screen content overlay options menu based upon the determined media type of content media currently accessed via the multiple media player device; displaying a first graphical menu pane of the full-screen content overlay options menu including the current setting status of the default available adjustment over full-screen content on a display; displaying a control pane to a side of the first graphical menu pane including an adjustment control associated with the default available adjustment for the multiple media player device; detecting an adjustment input associated with the adjustment control; adjusting the current setting status of the default available adjustment for the multiple media player device based upon the adjustment input; determining an adjusted setting status of the default available adjustment for the multiple media player device; and updating the control pane and the first graphical menu pane with the adjusted setting status of the default available adjustment for the multiple media player device.

In another implementation, a computer readable storage medium may store instructions which, when executed on one or more programmed processors, carry out a process of detecting, via a multiple media player device, a request to display a portion of a full-screen content overlay options menu of the multiple media player device including one of a remote control device up arrow key input and a remote control device down arrow key input, where the portion of the full-screen content overlay options menu includes less than all of the full-screen content overlay options menu; determining a media type of content media currently accessed via the multiple media player device; determining a current setting status of a default available adjustment of the multiple media player device associated with the portion of the full-screen content overlay options menu based upon the determined media type of content media currently accessed via the multiple media player device; displaying a first graphical menu pane of the full-screen content overlay options menu including the current setting status of the default available adjustment over full-screen content on a display; displaying a control pane to a side of the first graphical menu pane including an adjustment control associated with the default available adjustment for the multiple media player device; detecting an adjustment input associated with the adjustment control; adjusting the current setting status of the default available adjustment for the multiple media player device based upon the adjustment input; determining an adjusted setting status of the default available adjustment for the multiple media player device; and updating the control pane and the first graphical menu pane with the adjusted setting status of the default available adjustment for the multiple media player device.

In another implementation, a method of dynamically populating a user interface in response to user inputs of a multiple media player device involves detecting, via the multiple media player device, a request to display a portion of a full-screen content overlay options menu of the multiple media player device, where the portion of the full-screen content overlay options menu includes less than all of the full-screen content overlay options menu; determining a media type of content media currently accessed via the multiple media player device; determining a current setting status of an available adjustment of the multiple media player device associated with the portion of the full-screen content overlay options menu based upon the determined media type of content media currently accessed via the multiple media player device; and displaying a first graphical menu pane of the full-screen content overlay options menu including the current setting status of the available adjustment over full-screen content on a display.

In certain implementations, the method of detecting, via the multiple media player device, the request to display the portion of the full-screen content overlay options menu of the multiple media player device involves detecting a remote control device key input associated with the available adjustment for the multiple media player device. In certain implementations, the method of detecting the remote control device key input associated with the available adjustment for the multiple media player device involves detecting a designated remote control device navigation key associated with the portion of the full-screen content overlay options menu. In certain implementations, the method of detecting the remote control device key input associated with the available adjustment for the multiple media player device involves detecting one of a remote control device up arrow key input and a remote control device down arrow key input; and the method of determining the current setting status of the available adjustment of the multiple media player device associated with the portion of the full-screen content overlay options menu based upon the media type of content media currently accessed via the multiple media player device involves determining a current setting status of a default available adjustment for the multiple media player device. In certain implementations, the method further involves displaying a control pane to a side of the first graphical menu pane including an adjustment control associated with the available adjustment for the multiple media player device. In certain implementations, the method further involves detecting an adjustment input associated with the adjustment control; adjusting the current setting status of the available adjustment for the multiple media player device based upon the adjustment input; determining an adjusted setting status of the available adjustment for the multiple media player device; and updating the control pane and the first graphical menu pane with the adjusted setting status of the available adjustment for the multiple media player device. In certain implementations, the full-screen content overlay options menu includes a vertically wrapping full-screen content overlay options menu and the method further involves detecting a request to display an additional portion of the vertically wrapping full-screen content overlay options menu of the multiple media player device; determining a second current setting status of a second available adjustment of the multiple media player device associated with the additional portion of the vertically wrapping full-screen content overlay options menu based upon the media type of content media currently accessed via the multiple media player device; and displaying a second graphical menu pane including the second current setting status of the second available adjustment over the full-screen content on the display. In certain implementations, the method of displaying a second graphical menu pane including the second current setting status of the second available adjustment over the full-screen content on the display involves displaying the second graphical menu pane including the second current setting status of the second available adjustment vertically relative to the first graphical menu pane. In certain implementations, the method further involves detecting one of a remote control device up arrow key input and a remote control device down arrow key input from a remote control device; terminating display of the first graphical menu pane from a display location of the first graphical menu pane within the vertically wrapping full-screen content overlay options menu; displaying the second graphical menu pane including the second current setting status of the second available adjustment at the display location of the first graphical menu pane; and re-displaying the first graphical menu pane as a top graphical menu pane of the vertically wrapping full-screen content overlay options menu. In certain implementations, the method further involves detecting a remote control device key input associated with the available adjustment for the multiple media player device; determining that the detected remote control device key input is associated with a different available adjustment for the multiple media player device; determining a current setting status of the different available adjustment of the multiple media player device; determining a display location of the first graphical menu pane; terminating the display of the first graphical menu pane; and displaying a second graphical menu pane including the current setting status of the different available adjustment over the full-screen content on the display in the display location of the first graphical menu pane. In certain implementations, the associated available adjustment includes a content rewind adjustment, and the method of detecting, via the multiple media player device, the request to display the portion of the full-screen content overlay options menu of the multiple media player device involves detecting a remote control device left arrow key input; the method of displaying the first graphical menu pane of the full-screen content overlay options menu including the current setting status of the available adjustment over the full-screen content on the display involves displaying the first graphical menu pane in response to detecting the remote control device left arrow key input; and the method further involves beginning to rewind the content rendered on the display. In certain implementations, the method further involves displaying a control pane to a side of the second graphical menu pane including a content position adjustment control associated with the content rewind adjustment including a current content rendering location of content rendered on the display; determining whether continued actuations of the remote control device left arrow key input are detected; and iteratively adjusting the content position adjustment control to new content rendering locations of the content rendered on the display in response to each determined continued actuation of the remote control device left arrow key input. In certain implementations, the method further involves detecting a remote control device right arrow key input associated with a content fast forward adjustment for the multiple media player device; beginning to fast forward the content rendered on the display; determining whether continued actuations of the remote control device right arrow key input are detected; and iteratively adjusting the content position adjustment control to new content rendering locations of the content rendered on the display in response to each determined continued actuation of the remote control device right arrow key input. In certain implementations, the method of displaying the first graphical menu pane of the full-screen content overlay options menu including the current setting status of the available adjustment over the full-screen content on the display involves displaying the first graphical menu pane including the current setting status of the available adjustment over the full-screen content proximate to a lower corner of the display. In certain implementations, the method of displaying the first graphical menu pane including the current setting status of the available adjustment over the full-screen content proximate to the lower corner of the display involves displaying the first graphical menu pane including the current setting status of the available adjustment over the full-screen content proximate to a right lower corner of the display. In certain implementations, the display includes a touchscreen display and the method of detecting, via the multiple media player device, the request to display the portion of the full-screen content overlay options menu of the multiple media player device involves detecting a first touchscreen input proximate to a default display location of the portion of the full-screen content overlay options menu on the touchscreen display. In certain implementations, the method further involves detecting a second touchscreen input proximate to the default display location of the portion of the full-screen content overlay options menu; and displaying a control pane to a side of the first graphical menu pane including an adjustment control associated with the available adjustment for the multiple media player device. In certain implementations, the method further involves detecting one of a sliding touchscreen input and a rotating touchscreen input proximate to a display location of the adjustment control; adjusting the current setting status of the available adjustment for the multiple media player device based upon a magnitude and a direction of the one of the sliding touchscreen input and the rotating touchscreen input; determining an adjusted setting status of the available adjustment for the multiple media player device; and updating the control pane and the first graphical menu pane with the adjusted setting status of the available adjustment for the multiple media player device. In certain implementations, the method further involves detecting a second touchscreen input associated with a first display location above a display location of the first graphical menu pane; and displaying a plurality of graphical menu panes, each associated with one additional available adjustment of the multiple media player device associated with the full-screen content overlay options menu based upon the determined media type, above the first graphical menu pane. In certain implementations, the method further involves detecting a third touchscreen input associated with a second display location above the display location of the first graphical menu pane; scrolling the displayed plurality of graphical menu panes by a number of the graphical menu panes based upon a magnitude of distance between the second display location above the display location of the first graphical menu pane and the display location of the first graphical menu pane and relative to a size of each of the plurality of graphical menu panes; displaying a different one of the plurality of graphical menu panes at the display location of the first graphical menu pane; displaying a control pane to a side of the different one of the plurality of graphical menu panes including an adjustment control associated with the available adjustment for the multiple media player device associated with the different one of the plurality of graphical menu panes; and re-displaying the first graphical menu pane at a new location based upon the scrolled display of the plurality of graphical menu panes. In certain implementations, the media type of the content media currently accessed via the multiple media player device includes a type of media selected from a group consisting of: audio media, audio and video media, and still image media. In certain implementations, the method further involves determining a remote control device type based upon input signaling received from a remote control device; and selecting a remote control input command map to control the full-screen content overlay options menu based upon the determined remote control device type. In certain implementations, the method further involves assigning one remote control input command from the remote control input command map as a default remote control input command for accessing the portion of the full-screen content overlay options menu of the multiple media player device.

In certain implementations, the method further involves detecting repeated use of at least one general remote control device navigation key associated with a plurality of requests to display the portion of the full-screen content overlay options menu of the multiple media player device; and assigning one of the at least one general remote control device navigation keys as a default remote control device navigation key associated with displaying the portion of the full-screen content overlay options menu. In certain implementations, the method of displaying the first graphical menu pane of the full-screen content overlay options menu including the current setting status of the available adjustment over the full-screen content on the display involves displaying the first graphical menu pane including a current setting status icon associated with the available adjustment with an option icon that represents the available adjustment over the full-screen content on the display.

In another implementation, a computer readable storage medium may store instructions which, when executed on one or more programmed processors, carry out a process of detecting, via the multiple media player device, a request to display a portion of a full-screen content overlay options menu of the multiple media player device, where the portion of the full-screen content overlay options menu includes less than all of the full-screen content overlay options menu; determining a media type of content media currently accessed via the multiple media player device; determining a current setting status of an available adjustment of the multiple media player device associated with the portion of the full-screen content overlay options menu based upon the determined media type of content media currently accessed via the multiple media player device; and displaying a first graphical menu pane of the full-screen content overlay options menu including the current setting status of the available adjustment over full-screen content on a display.

A multiple media player device, consistent with another implementation, has a display; an input device; and a processor programmed to detect, via the input device, a request to display a portion of a full-screen content overlay options menu including one of a remote control device up arrow key input and a remote control device down arrow key input, where the portion of the full-screen content overlay options menu includes less than all of the full-screen content overlay options menu; determine a media type of content media currently accessed via the multiple media player device; determine a current setting status of a default available adjustment associated with the portion of the full-screen content overlay options menu based upon the determined media type of content media currently accessed; display a first graphical menu pane of the full-screen content overlay options menu including the current setting status of the default available adjustment over full-screen content on the display; display a control pane to a side of the first graphical menu pane including an adjustment control associated with the default available adjustment; detect an adjustment input via the input device associated with the adjustment control; adjust the current setting status of the default available adjustment based upon the adjustment input; determine an adjusted setting status of the default available adjustment; and update the control pane and the first graphical menu pane with the adjusted setting status of the default available adjustment.

A multiple media player device, consistent with another implementation, has a display; an input device; and a processor programmed to detect, via the input device, a request to display a portion of a full-screen content overlay options menu, where the portion of the full-screen content overlay options menu includes less than all of the full-screen content overlay options menu; determine a media type of content media currently accessed via the multiple media player device; determine a current setting status of an available adjustment associated with the portion of the full-screen content overlay options menu based upon the determined media type of content media currently accessed; and display a first graphical menu pane of the full-screen content overlay options menu including the current setting status of the available adjustment over full-screen content on the display.

In certain implementations, in being programmed to detect, via the input device, the request to display the portion of the full-screen content overlay options menu, the processor is programmed to detect a remote control device key input associated with the available adjustment via the input device. In certain implementations, in being programmed to detect the remote control device key input associated with the available adjustment via the input device, the processor is programmed to detect a designated remote control device navigation key associated with the portion of the full-screen content overlay options menu. In certain implementations, in being programmed to detect the remote control device key input associated with the available adjustment via the input device, the processor is programmed to detect one of a remote control device up arrow key input and a remote control device down arrow key input; and determine the current setting status of the available adjustment associated with the portion of the full-screen content overlay options menu based upon the media type of content media currently accessed, the processor is programmed to determine a current setting status of a default available adjustment. In certain implementations, the processor is further programmed to display a control pane to a side of the first graphical menu pane including an adjustment control associated with the available adjustment. In certain implementations, the processor is further programmed to detect an adjustment input via the input device associated with the adjustment control; adjust the current setting status of the available adjustment based upon the adjustment input; determine an adjusted setting status of the available adjustment; and update the control pane and the first graphical menu pane with the adjusted setting status of the available adjustment. In certain implementations, the full-screen content overlay options menu includes a vertically wrapping full-screen content overlay options menu and where the processor is further programmed to detect, via the input device, a request to display an additional portion of the vertically wrapping full-screen content overlay options menu; determine a second current setting status of a second available adjustment associated with the additional portion of the vertically wrapping full-screen content overlay options menu based upon the media type of content media currently accessed; and display a second graphical menu pane including the second current setting status of the second available adjustment over the full-screen content on the display. In certain implementations, in being programmed to display a second graphical menu pane including the second current setting status of the second available adjustment over the full-screen content on the display, the processor is programmed to display the second graphical menu pane including the second current setting status of the second available adjustment vertically relative to the first graphical menu pane. In certain implementations, the processor is further programmed to detect, via the input device, one of a remote control device up arrow key input and a remote control device down arrow key input from a remote control device; terminate display of the first graphical menu pane from a display location of the first graphical menu pane within the vertically wrapping full-screen content overlay options menu; display the second graphical menu pane including the second current setting status of the second available adjustment at the display location of the first graphical menu pane; and re-display the first graphical menu pane as a top graphical menu pane of the vertically wrapping full-screen content overlay options menu. In certain implementations, the processor is further programmed to detect, via the input device, a remote control device key input associated with the available adjustment; determine that the detected remote control device key input is associated with a different available adjustment; determine a current setting status of the different available adjustment; determine a display location of the first graphical menu pane; terminate the display of the first graphical menu pane; and display a second graphical menu pane including the current setting status of the different available adjustment over the full-screen content on the display in the display location of the first graphical menu pane. In certain implementations, the associated available adjustment includes a content rewind adjustment, and, in being programmed to detect, via the input device, the request to display the portion of the full-screen content overlay options menu, the processor is programmed to detect a remote control device left arrow key input; in being programmed to display the first graphical menu pane of the full-screen content overlay options menu including the current setting status of the available adjustment over the full-screen content on the display, the processor is programmed to display the first graphical menu pane in response to detecting the remote control device left arrow key input; and the processor is further programmed to begin to rewind the content rendered on the display. In certain implementations, the processor is further programmed to display a control pane to a side of the second graphical menu pane including a content position adjustment control associated with the content rewind adjustment including a current content rendering location of content rendered on the display; determine whether continued actuations of the remote control device left arrow key input are detected; and iteratively adjust the content position adjustment control to new content rendering locations of the content rendered on the display in response to each determined continued actuation of the remote control device left arrow key input. In certain implementations, the processor is further programmed to detect, via the input device, a remote control device right arrow key input associated with a content fast forward adjustment; begin to fast forward the content rendered on the display; determine whether continued actuations of the remote control device right arrow key input are detected; and iteratively adjust the content position adjustment control to new content rendering locations of the content rendered on the display in response to each determined continued actuation of the remote control device right arrow key input. In certain implementations, in being programmed to display the first graphical menu pane of the full-screen content overlay options menu including the current setting status of the available adjustment over the full-screen content on the display, the processor is programmed to display the first graphical menu pane including the current setting status of the available adjustment over the full-screen content proximate to a lower corner of the display. In certain implementations, in being programmed to display the first graphical menu pane including the current setting status of the available adjustment over the full-screen content proximate to the lower corner of the display, the processor is programmed to display the first graphical menu pane including the current setting status of the available adjustment over the full-screen content proximate to a right lower corner of the display. In certain implementations, the display includes a touchscreen display and, in being programmed to detect, via the input device, the request to display the portion of the full-screen content overlay options menu, the processor is programmed to detect a first touchscreen input proximate to a default display location of the portion of the full-screen content overlay options menu on the touchscreen display. In certain implementations, the processor is further programmed to detect a second touchscreen input proximate to the default display location of the portion of the full-screen content overlay options menu; and display a control pane to a side of the first graphical menu pane including an adjustment control associated with the available adjustment. In certain implementations, the processor is further programmed to detect, via the input device, one of a sliding touchscreen input and a rotating touchscreen input proximate to a display location of the adjustment control; adjust the current setting status of the available adjustment based upon a magnitude and a direction of the one of the sliding touchscreen input and the rotating touchscreen input; determine an adjusted setting status of the available adjustment; and update the control pane and the first graphical menu pane with the adjusted setting status of the available adjustment. In certain implementations, the processor is further programmed to detect, via the input device, a second touchscreen input associated with a first display location above a display location of the first graphical menu pane; and display a plurality of graphical menu panes, each associated with one additional available adjustment associated with the full-screen content overlay options menu based upon the determined media type, above the first graphical menu pane. In certain implementations, the processor is further programmed to detect, via the input device, a third touchscreen input associated with a second display location above the display location of the first graphical menu pane; scroll the displayed plurality of graphical menu panes by a number of the graphical menu panes based upon a magnitude of distance between the second display location above the display location of the first graphical menu pane and the display location of the first graphical menu pane and relative to a size of each of the plurality of graphical menu panes; display a different one of the plurality of graphical menu panes at the display location of the first graphical menu pane; display a control pane to a side of the different one of the plurality of graphical menu panes including an adjustment control associated with the available adjustment associated with the different one of the plurality of graphical menu panes; and re-display the first graphical menu pane at a new location based upon the scrolled display of the plurality of graphical menu panes. In certain implementations, the media type of the content media currently accessed includes a type of media selected from a group consisting of: audio media, audio and video media, and still image media. In certain implementations, the processor is further programmed to determine a remote control device type based upon input signaling received from a remote control device; and select a remote control input command map to control the full-screen content overlay options menu based upon the determined remote control device type. In certain implementations, the processor is further programmed to assign one remote control input command from the remote control input command map as a default remote control input command for accessing the portion of the full-screen content overlay options menu. In certain implementations, the processor is further programmed to detect repeated use of at least one general remote control device navigation key associated with a plurality of requests to display the portion of the full-screen content overlay options menu; and assign one of the at least one general remote control device navigation keys as a default remote control device navigation key associated with displaying the portion of the full-screen content overlay options menu. In certain implementations, in being programmed to display the first graphical menu pane of the full-screen content overlay options menu including the current setting status of the available adjustment over the full-screen content on the display, the processor is programmed to display the first graphical menu pane including a current setting status icon associated with the available adjustment with an option icon that represents the available adjustment over the full-screen content on the display.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A multiple media player device, comprising:
   an input device; and
   one or more processors programmed to:
      detect, via the input device, a request to display a portion of a full-screen content overlay options menu, where the portion of the full-screen content overlay options menu comprises less than all of the full-screen content overlay options menu;

determine which media type of a plurality of media types of content media is currently being accessed via the multiple media player device;

determine a current setting status of each of a plurality of available adjustment options associated with the portion of the full-screen content overlay options menu based upon the determined media type of content media currently accessed;

pair each of the plurality of current setting status with an option icon representing one of the plurality of available adjustment options;

send a first output signal to generate a first graphical menu pane of the full-screen content overlay options menu comprising current setting status of a default available adjustment option over full-screen video content along with an option icon representing the default available adjustment option;

the output signal further generating a control pane to a side of the first graphical menu pane comprising an adjustment control associated with the default available adjustment option for the multiple media player device;

detect an adjustment input associated with the adjustment control;

adjust the current setting status of the default available adjustment option for the multiple media player device based upon the adjustment input;

determine an adjusted current setting status of the default available adjustment option for the multiple media player device;

update the control pane and the first graphical menu pane with the adjusted current setting status of the default available adjustment option for the multiple media player device;

detect a request to display an additional portion of the full-screen content overlay options menu of the multiple media player device;

determine a second current setting status of a second available adjustment option of the multiple media player device associated with the additional portion of the full-screen content overlay options menu based upon the media type of content media currently accessed via the multiple media player device; and send a second output signal to generate a second graphical menu pane comprising the second current setting status of the second available adjustment option over the full-screen content;

wherein the second graphical menu pane comprising the second current setting status of the second available adjustment option along with an option icon representing the second available adjustment option over the full-screen video content comprises the second graphical menu pane comprising the second current setting status of the second available adjustment option vertically relative to the first graphical menu pane.

2. The multiple media player device according to claim 1, where in being programmed to detect, via the input device, the request to display the portion of the full-screen content overlay options menu, the processor is further programmed to:

detect a remote control device key input associated with the available adjustment options via the input device.

3. The multiple media player device according to claim 2, wherein being programmed to detect the remote control device key input associated with the available adjustment options via the input device, the processor is further programmed to detect a designated remote control device navigation key associated with the portion of the full-screen content overlay options menu.

4. The multiple media player device according to claim 2, wherein being programmed to:

detect the remote control device key input associated with the available adjustment options via the input device, the processor is programmed to detect one of a remote control device up arrow key input and a remote control device down arrow key input; and determine the current setting status of the available adjustment options associated with the portion of the full-screen content overlay options menu based upon the media type of content media currently accessed, the processor is further programmed to determine the current setting status of the default available adjustment option.

5. The multiple media player device according to claim 1, wherein the processor is further programmed to:

generate a signal to place the control pane to a side of the first graphical menu pane comprising the adjustment control associated with the default available adjustment option.

6. The multiple media player device according to claim 5, wherein the processor is further programmed to:

detect the adjustment input via the input device associated with the adjustment control.

7. The multiple media player device according to claim 1, wherein the processor is further programmed to:

detect, via the input device, one of a remote control device up arrow key input and a remote control device down arrow key input from a remote control device;

terminate the first output signal of the first graphical menu pane from a location of the first graphical menu pane within the full-screen content overlay options menu;

send a signal to generate the second graphical menu pane comprising the second current setting status of the second available adjustment option at the location of the first graphical menu pane; and re-generate the first graphical menu pane as a top graphical menu pane of the full-screen content overlay options menu, which is vertically wrappable.

8. The multiple media player device according to claim 1, wherein the processor is further programmed to:

detect, via the input device, a remote control device key input associated with the default available adjustment option;

determine that the detected remote control device key input is associated with a different available adjustment option;

determine a current setting status of the different available adjustment option;

determine a location of the first graphical menu pane;

terminate the first graphical menu pane; and send a signal to generate a second graphical menu pane comprising the current setting status of the different available adjustment option over the full-screen content in the location of the first graphical menu pane.

9. The multiple media player device according to claim 1, wherein the associated available adjustment control comprises a content rewind adjustment, and wherein being programmed to:

detect, via the input device, the request to display the portion of the full-screen content overlay options menu, the processor is programmed to detect a remote control device left arrow key input;

send the output signal containing the first graphical menu pane of the full-screen content overlay options menu comprising the current setting status of the available adjustment over the full-screen content, the processor is programmed to output the first graphical menu pane in response to detecting the remote control device left arrow key input; and the processor is further programmed to begin to rewind the content.

10. The multiple media player device according to claim 1, wherein the processor is further programmed to:

generate a control pane to a side of the second graphical menu pane comprising a content position adjustment control associated with the content rewind adjustment comprising a current content rendering location of content;

determine whether continued actuations of a remote control device left arrow key input are detected; and iteratively adjust the content position adjustment control to new content rendering locations of the content in response to each determined continued actuation of the remote control device left arrow key input.

11. The multiple media player device according to claim 10, wherein the processor is further programmed to:

detect, via the input device, a remote control device right arrow key input associated with a content fast forward adjustment;

begin to fast forward the content;

determine whether continued actuations of the remote control device right arrow key input are detected; and iteratively adjust the content position adjustment control to new content rendering locations of the content in response to each determined continued actuation of the remote control device right arrow key input.

12. The multiple media player device according to claim 1, wherein the processor is further programmed to send the first graphical menu pane comprising the current setting status of the default available adjustment option over the full-screen content proximate to a lower corner.

13. The multiple media player device according to claim 12, wherein the processor is further programmed to send the first graphical menu pane comprising the current setting status of the default available adjustment option over the full-screen content proximate to a right lower corner.

14. The multiple media player device according to claim 1, wherein the processor is further programmed to detect a first touchscreen input proximate to a default location of the portion of the full-screen content overlay options menu.

15. The multiple media player device according to claim 14, wherein the processor is further programmed to:

detect a second touchscreen input proximate to the default location of the portion of the full-screen content overlay options menu; and generate a control pane to a side of the first graphical menu pane comprising the adjustment control associated with the default available adjustment option.

16. The multiple media player device according to claim 15, wherein the processor is further programmed to:

detect, via the input device, one of a sliding touchscreen input and a rotating touchscreen input proximate to a location of the adjustment control;

adjust the current setting status of the default available adjustment option based upon a magnitude and a direction of the one of the sliding touchscreen input and the rotating touchscreen input;

determine an adjusted setting status of the default available adjustment option; and update the control pane and the first graphical menu pane with the adjusted setting status of the default available adjustment option.

17. The multiple media player device according to claim 14, wherein the processor is further programmed to:

detect, via the input device, a second touchscreen input associated with a first location above a location of the first graphical menu pane; and generate a plurality of graphical menu panes, each associated with one additional available adjustment option associated with the full-screen content overlay options menu based upon the determined media type, above the first graphical menu pane.

18. The multiple media player device according to claim 17, wherein the processor is further programmed to:

detect, via the input device, a third touchscreen input associated with a second location above the location of the first graphical menu pane;

scroll the plurality of graphical menu panes by a number of the graphical menu panes based upon a magnitude of distance between the second location above the location of the first graphical menu pane and the location of the first graphical menu pane and relative to a size of each of the plurality of graphical menu panes;

output a different one of the plurality of graphical menu panes at the location of the first graphical menu pane;

generate a control pane to a side of the different one of the plurality of graphical menu panes comprising an adjustment control associated with available adjustment options associated with the different one of the plurality of graphical menu panes; and re-generate the first graphical menu pane at a new location.

19. The multiple media player device according to claim 1, where the media type of the content media currently accessed comprises a type of media selected from a group consisting of: audio media, audio and video media, and still image media.

20. The multiple media player device according to claim 1, where the processor is further programmed to:

determine a remote control device type based upon input signaling received from a remote control device; and select a remote control input command map to control the full-screen content overlay options menu based upon the determined remote control device type.

21. The multiple media player device according to claim 20, where the processor is further programmed to:

assign one remote control input command from the remote control input command map as a default remote control input command for accessing the portion of the full-screen content overlay options menu.

22. The multiple media player device according to claim 1, wherein the processor is further programmed to:

detect repeated use of at least one general remote control device navigation key associated with a plurality of requests to display the portion of the full-screen content overlay options menu; and assign one of the at least one general remote control device navigation key as a default remote control device navigation key associated with the portion of the full-screen content overlay options menu.

23. The multiple media player device according to claim 1, wherein the processor is further programmed to output the first graphical menu pane comprising a current setting status icon associated with the default available adjustment option with an option icon that represents the default available adjustment option over the full-screen content.

24. A non-transitory computer readable storage medium storing instructions which, when executed on one or more programmed processors, carry out a method comprising:

- detecting, via a multiple media player device, a request to display a portion of a full-screen content overlay options menu of the multiple media player device comprising one of a remote control device up arrow key input and a remote control device down arrow key input, where the portion of the full-screen content overlay options menu comprises less than all of the full-screen content overlay options menu;
- determining which media type of a plurality of media types of content media is currently being accessed via the multiple media player device;
- determining a current setting status of each of a plurality of available adjustment options of the multiple media player device associated with the portion of the full-screen content overlay options menu based upon the determined media type of content media currently accessed via the multiple media player device;
- pairing each of the plurality of current setting status with an option icon representing one of the plurality of available adjustment options;
- generating a first graphical menu pane of the full-screen content overlay options menu comprising current setting status of a default available adjustment option over full-screen video content along with an option icon representing the default available adjustment option;
- generating a control pane to a side of the first graphical menu pane comprising an adjustment control associated with the default available adjustment option for the multiple media player device;
- detecting an adjustment input associated with the adjustment control;
- adjusting the current setting status of the default available adjustment option for the multiple media player device based upon the adjustment input;
- determining an adjusted current setting status of the default available adjustment option for the multiple media player device;
- updating the control pane and the first graphical menu pane with the adjusted current setting status of the default available adjustment option for the multiple media player device; and
- wherein a second graphical menu pane comprising the second current setting status of a second available adjustment option along with an option icon representing the second available adjustment option over a full-screen video content comprises the second graphical menu pane comprising the second current setting status of the second available adjustment option vertically relative to the first graphical menu pane.

25. The non-transitory computer readable storage medium according to claim 24, where detecting, via the multiple media player device, the request to display the portion of the full-screen content overlay options menu of the multiple media player device comprises:

- detecting a remote control device key input associated with the available adjustment options for the multiple media player device.

26. The non-transitory computer readable storage medium according to claim 25, where detecting the remote control device key input associated with the available adjustment options for the multiple media player device comprises detecting a designated remote control device navigation key associated with the portion of the full-screen content overlay options menu.

27. The non-transitory computer readable storage medium according to claim 25, wherein:

- detecting the remote control device key input associated with the available adjustment options for the multiple media player device comprises detecting one of a remote control device up arrow key input and a remote control device down arrow key input; and
- determining the current setting status of the available adjustment options of the multiple media player device associated with the portion of the full-screen content overlay options menu based upon the media type of content media currently accessed via the multiple media player device comprises determining a current setting status of the default available adjustment option for the multiple media player device.

* * * * *